(12) United States Patent
Choi et al.

(10) Patent No.: US 10,212,545 B2
(45) Date of Patent: Feb. 19, 2019

(54) METHOD AND APPARATUS FOR DEVICE POSITIONING

(71) Applicant: Samsung Electronics Co., Ltd., Gyeonggi-do (KR)

(72) Inventors: Won Suk Choi, Seoul (KR); Jeong Min Park, Gyeonggi-do (KR); Kwang Sub Son, Gyeonggi-do (KR); Jae Woong Chun, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 193 days.

(21) Appl. No.: 14/825,281

(22) Filed: Aug. 13, 2015

(65) Prior Publication Data
US 2016/0050531 A1 Feb. 18, 2016

(30) Foreign Application Priority Data
Aug. 14, 2014 (KR) ........................ 10-2014-0106060

(51) Int. Cl.
*H04W 4/02* (2018.01)

(52) U.S. Cl.
CPC ........... *H04W 4/023* (2013.01); *H04W 4/027* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,640,288 B2 * | 12/2009 | Yao | ................... | H04W 4/003 455/414.2 |
| 8,307,029 B2 * | 11/2012 | Davis | ................... | G06Q 10/107 455/26.1 |
| 8,538,462 B2 | 9/2013 | Forstall et al. | | |
| 2009/0005070 A1 | 1/2009 | Forstall et al. | | |
| 2012/0105214 A1 * | 5/2012 | Sanders | ................ | H04L 67/327 340/10.42 |
| 2012/0172054 A1 | 7/2012 | Waters et al. | | |
| 2012/0249372 A1 | 10/2012 | Jovicic et al. | | |
| 2012/0289243 A1 | 11/2012 | Tarlow et al. | | |
| 2013/0079037 A1 * | 3/2013 | Dobyns | ................ | H04W 4/008 455/456.3 |
| 2013/0088384 A1 | 4/2013 | Syrjarinne et al. | | |
| 2013/0143596 A1 | 6/2013 | Forstall et al. | | |
| 2014/0179337 A1 * | 6/2014 | Alpert | ................ | H04W 64/00 455/456.1 |
| 2016/0007158 A1 * | 1/2016 | Venkatraman | ........ | H04W 4/023 455/456.2 |
| 2016/0021617 A1 * | 1/2016 | Hsiao | ................ | H04W 52/0277 455/456.6 |

\* cited by examiner

*Primary Examiner* — Steven Kelley
(74) *Attorney, Agent, or Firm* — Cha & Reiter, LLC

(57) ABSTRACT

An electronic device comprising: a memory; and one or more processors configured to: assign a first positioning role to the electronic device and a second positioning role to a counterpart device, the counterpart device and the electronic device being part of a communications network, obtain at least one of a location information and a supplemental location information based on the first positioning role and the second positioning role, and detect a location of the electronic device based on the at least one of the location information and supplemental location information.

20 Claims, 14 Drawing Sheets

METHOD AND APPARATUS FOR DEVICE POSITIONING

CLAIM OF PRIORITY

This application claims the benefit under 35 U.S.C. § 119(a) of a Korean patent application filed on Aug. 14, 2014 in the Korean Intellectual Property Office and assigned Serial number 10-2014-0106060, the entire disclosure of which is hereby incorporated by reference.

TECHNICAL FIELD

The present disclosure relates to electronic devices, and more particularly to a method and apparatus for device positioning.

BACKGROUND

Various types of electronic products have been developed with the development of electronic technology. Recently, portable electronic devices such as smartphones, tablet PCs, and the like are widely used. Such portable electronic devices are so multifunctional as to provide various services, for example, photographing, music playback, video playback, an electronic mail service, a social networking service (SNS), a map service, a bus guide, a subway guide, and the like.

Various services provided by an electronic device may require location information, and the electronic device may provide the location information required for providing services using a positioning means such as a global positioning system (GPS) module. Various positioning technologies recently developed are based on not only the GPS but also wireless fidelity (Wi-Fi), Bluetooth, or the like.

As various electronic devices are widely used, various services are developed to be provided on the basis of a device-to-device network. For example, a peripheral electronic device such as a smartwatch, smart glasses, or the like may interwork with a main electronic device such as a smartphone so as to provide various services.

As described above, an electronic device may obtain location information using a positioning means provided in the electronic device if the location information is required. However, in the case where positioning is not available due to a state or a location of the electronic device, the location information may be unable to be obtained.

A feature of location information (e.g., accuracy, required time, or the like) required for a specific service may vary with service characteristics, but, in the case where the electronic device is provided with a limited positioning means alone, unnecessary power consumption may occur. On the contrary, in the case where the electronic device is provided with various positioning means for obtaining location information suitable for the purpose of a service, the manufacture of the electronic device may not be efficient in terms of cost.

In a situation in which a plurality of electronic devices connected by a network have identical positioning means, the plurality of electronic devices may redundantly perform positioning using the identical positioning means.

SUMMARY

According to aspects of the disclosure, an electronic device is provided comprising: a memory; and one or more processors configured to: assign a first positioning role to the electronic device and a second positioning role to a counterpart device, the counterpart device and the electronic device being part of a communications network, obtain at least one of a location information and a supplemental location information based on the first positioning role and the second positioning role, and detect a location of the electronic device based on the at least one of the location information and supplemental location information.

According to aspects of the disclosure, a method is provided comprising: assigning, by a first electronic device, a first positioning role to the first electronic device and a second positioning role to a second electronic device, wherein the first electronic device and the second electronic device are part of a communications network, obtaining at least one of a location information and a supplemental location information based on the first positioning role and the second positioning role, and detecting a location of the first electronic device based on the least one of the location information and the supplemental location information.

According to aspects of the disclosure, a non-transitory computer-readable recording medium is provided that stores processor-executable instructions which when executed by one or more processors, cause the one or more processors to perform a method comprising: assigning, by a first electronic device, a first positioning role to the first electronic device and a second positioning role to a second electronic device, wherein the first electronic device and the second electronic device are part of a communications network, obtaining at least one of a location information and a supplemental location information based on the first positioning role and the second positioning role, and detecting a location of the first electronic device based on the least one of the location information and the supplemental location information.

DETAILED DESCRIPTION

Figure 1:
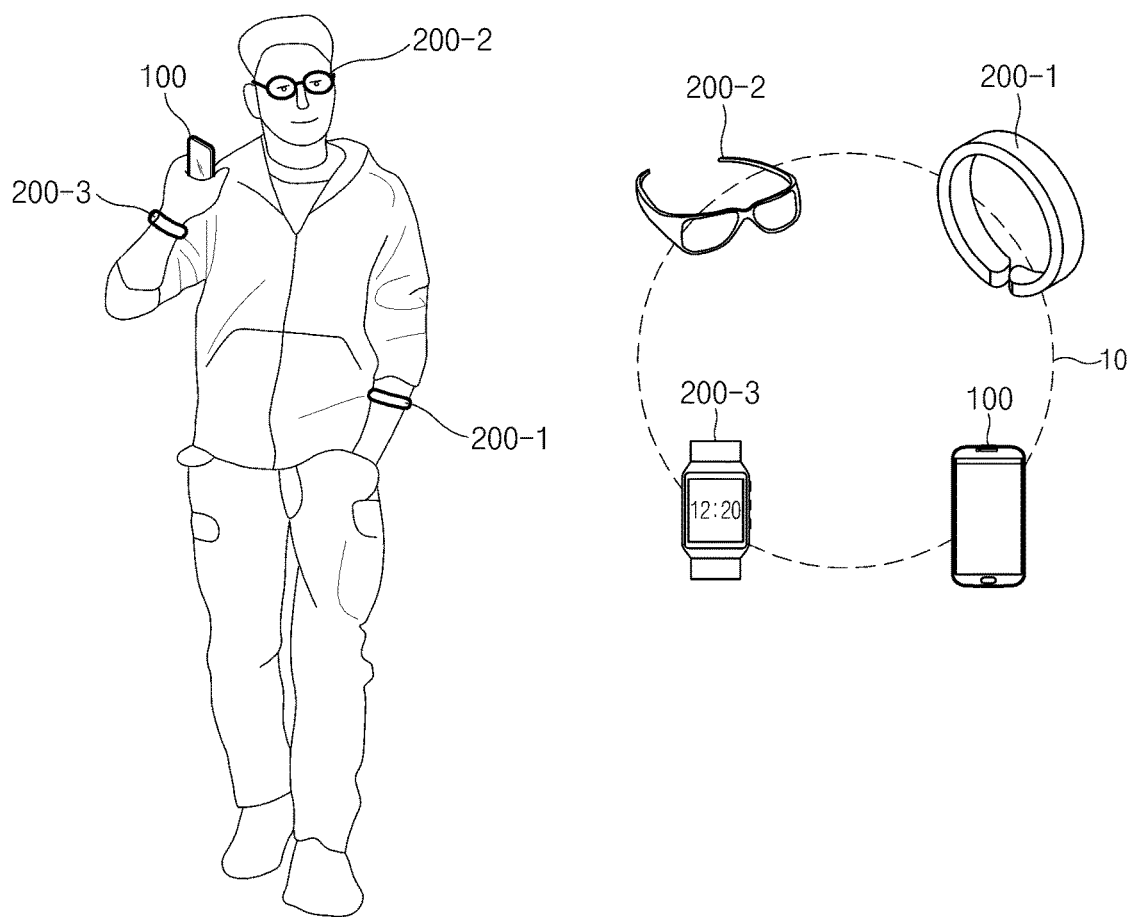
FIG. 1 is a diagram illustrating an example of a positioning system according to various embodiments of the present disclosure.

Hereinafter, various embodiments of the present disclosure will be described with reference to the accompanying drawings. The present disclosure may be variously modified and may include various embodiments. However, specific embodiments are exemplarily illustrated in the drawings and detailed descriptions related thereto are provided. However, it should be understood that various embodiments of the present disclosure are not limited to specific examples but rather include all modifications, equivalents and alternatives that fall within the spirit and scope of various embodiments of the present disclosure. Regarding the drawings, like reference numerals refer to like elements.

The term "include," "comprise," "including," or "comprising" used herein indicates disclosed functions, operations, or existence of elements but does not exclude other functions, operations or elements. It should be further understood that the term "include", "comprise", "have", "including", "comprising", or "having" used herein specifies the presence of stated features, numbers, steps, operations, elements, components, or combinations thereof but does not preclude the presence or addition of one or more other features, numbers, steps, operations, elements, components, or combinations thereof.

The meaning of the term "or" used herein includes any combination of the words connected by the term "or". For example, the wording "A or B" may indicate A, B, or both A and B.

The terms such as "first", "second", and the like used herein may refer to various elements of various embodiments of the present disclosure, but do not limit the elements. For example, such terms do not limit the order and/or priority of the elements. Such terms may be used to distinguish one element from another element. For example, a first user device and a second user device indicate different user devices. For example, without departing the scope of various embodiments of the present disclosure, a first element may be referred to as a second element and vice versa.

It should be understood that when an element is referred to as being "connected" or "coupled" to another element, it can be directly connected or coupled to the other element or intervening elements may be present between the element and the other element. On the contrary, it should be understood that when an element is referred to as being "directly connected" or "directly coupled" to another element, there are no intervening elements between the element and the other element.

The terminology used herein is not for delimiting various embodiments of the present disclosure but for describing specific examples. The terms of a singular form may include plural forms unless otherwise specified.

The terms used herein, including technical or scientific terms, have the same meanings as understood by those skilled in the art unless otherwise defined herein.

The commonly used terms such as those defined in a dictionary should be interpreted in the same context as in the related art and should not be interpreted in an idealized or overly formal sense unless otherwise defined explicitly.

An electronic device according to various embodiments of the present disclosure may have a positioning function. For example, the electronic device may include at least one of a smartphone, a tablet personal computer (PC), a mobile phone, a video telephone, an electronic book reader, a desktop PC, a laptop PC, a netbook computer, a personal digital assistant (PDA), a portable multimedia player (PMP), a Motion Picture Experts Group (MPEG-1 or MPEG-2) Audio Layer 3 (MP3) player, a mobile medical device, a camera, or a wearable device (e.g., a head-mounted-devices (HMD) such as electronic glasses, an electronic apparel, an electronic bracelet, an electronic necklace, an electronic appcessory, an electronic tattoo, or a smartwatch).

According to some various embodiments of the present disclosure, an electronic device may be a smart home appliance having a positioning function. The smart home appliance may include at least one of, for example, a television (TV), a digital versatile disc (DVD) player, an audio, a refrigerator, an air conditioner, a cleaner, an oven, a microwave oven, a washing machine, an air cleaner, a set-top box, a TV box (e.g., Samsung HomeSync™, Apple TV™, or Google TV™), a game console, an electronic dictionary, an electronic key, a camcorder, or an electronic picture frame.

According to some various embodiments of the present disclosure, an electronic device may include at least one of a medical device (e.g., a magnetic resonance angiography (MRA), a magnetic resonance imaging (MRI), a computed tomography (CT), a scanner, an ultrasonic device, or the like), a navigation device, a global positioning system (GPS) receiver, an event data recorder (EDR), a flight data recorders (FDR), a vehicle infotainment device, electronic equipment for vessels (e.g., a navigation system, a gyrocompass, or the like), avionics, a security device, a head unit for a vehicle, an industrial or home robot, an automatic teller's machine (ATM), or a point of sales (POS).

According to some various embodiments of the present disclosure, an electronic device may include at least one of a part of furniture or a building/structure, an electronic board, an electronic signature receiving device, a projector, or a measuring instrument (e.g., a water meter, an electricity meter, a gas meter, a wave meter, or the like) having a positioning function. An electronic device according to various embodiments of the present disclosure may be one or more combinations of the above-mentioned devices. Furthermore, an electronic device according to various embodiments of the present disclosure may be a flexible device. It would be obvious to those skilled in the art that an electronic device according to various embodiments of the present disclosure is not limited to the above-mentioned devices.

Hereinafter, an electronic device according to various embodiments of the present disclosure will be described with reference to the accompanying drawings. The term "user" used herein may refer to a person who uses an electronic device or may refer to a device (e.g., an artificial electronic device) that uses an electronic device.

FIG. 1 is a diagram illustrating an example of a positioning system, according to various embodiments of the present disclosure.

Referring to FIG. 1, a positioning system 1000 may include a main electronic device (or a first electronic device) 100 and at least one peripheral electronic device 200-1 to 200-3. According to an embodiment of the present disclosure, the main electronic device 100 and the peripheral electronic devices 200 may both be part of a network 10. For example, the network 10 may have a mesh-type structure in which each of the main electronic device 100 and peripheral electronic devices 200 is connected to each other. For another example, the network 10 may have a star-type structure in which each of the peripheral electronic devices 200 is connected to a central hub, i.e., the main electronic device 100. The peripheral electronic devices 200 may be located within a communication-enabled distance from the main electronic device 100.

According to an embodiment of the present disclosure, the main electronic device 100 may be a smartphone. According to an embodiment of the present disclosure, the peripheral electronic devices 200 may be wearable electronic devices. For example, referring to FIG. 1, a first peripheral electronic device 200-1 may be a smart band, a second peripheral electronic device 200-1 may be smart glasses, and a third peripheral electronic device 200-3 may be a smartwatch. Although FIG. 1 illustrates that a smartphone operates as a main electronic device, one of the peripheral electronic device 200-1 to 200-3 of FIG. 1 may operate as a main electronic device depending on situations.

According to an embodiment of the present disclosure, the main electronic device 100 and at least one peripheral electronic device 200-1 to 200-3 may include different types of positioning means and/or positioning information (e.g., location information or supplemental location information). For example, the main electronic device 100 may include a GPS module, a Wi-Fi module, a Bluetooth module, a pedestrian dead-reckoning (PDR) module, and a database of an electronic map of a specific region. The first peripheral electronic device 200-1 may include assisted GPS (A-GPS) information. The second peripheral electronic device 200-2 may include a visible light communication (VLC) module. The third peripheral electronic device 200-3 may include PDR information obtained by various sensors (e.g., an acceleration sensor, an angular velocity sensor, a geomagnetic sensor, or the like).

According to an embodiment of the present disclosure, each of the main electronic device 100 and the peripheral electronic devices 200 may generate a respective positioning profile. The positioning profile of a particular device may include information required for cooperative positioning (positioning through cooperation between a specific electronic device and another electronic device adjacent thereto). According to an embodiment of the present disclosure, the positioning profile may include at least one of positioning means information of an electronic device, location information measured currently or previously by a positioning means, supplemental location information for each positioning means (or, additional location information), current positioning means information of an electronic device, priority information of a positioning means, data synchronization information of an electronic device, data type of location information or supplemental location information, or state information of an electronic device.

The positioning means information represents information on the type of a positioning means (or, a positioning technology) that that is available in each respective electronic device. For example, the positioning means may include at least one of a global navigation satellite system (GNSS) (e.g., GPS), Wi-Fi positioning system (WPS), PDR, cell positioning, VLC positioning, earth's magnetic field positioning, ultrasonic positioning, Bluetooth positioning, infrared (IrDA) positioning, simultaneous localization and mapping (SLAM), ultra-wideband (UWB) positioning, RFID positioning, or fingerprint positioning.

The supplemental location information for each positioning means represents additional information that is unable to be used alone to discern a device's location, but is nonetheless necessary, helpful, or otherwise usable for identifying the device's location by using a particular positioning means. For example, the supplemental location information may include at least one of access point (AP) information, a MAC address, a beacon, time information, network information, traffic information, weather information, advertisement information, information obtained through camera image recognition, map information, map tile information, fingerprint information (Wi-Fi, Bluetooth, magnetic field, ZigBee, or the like), tag information (NFC, RFID, barcode, or the like), values of various sensors (e.g., an acceleration sensor, an angular velocity sensor, a geomagnetic sensor, a gyro sensor, an altitude sensor, or the like), or supplemental satellite navigation information.

The priority information of a positioning means represents a priority order for a plurality of positioning means. According to an embodiment of the present disclosure, this information may include a plurality of pieces of priority information classified according to at least one of accuracy, power consumption, or a time required for positioning. For example, the priority information may include priority information in which positioning means having higher accuracy are given a greater priority that those with comparatively lower accuracy. As another example, the priority information may include priority information in which positioning means having a lower power consumption are given a greater priority than positioning means having a comparatively higher power consumption. As another example, the priority information may include priority information in which positioning means that are capable of determining location faster are granted a higher priority that positioning means that are comparatively slower.

The data synchronization information of an electronic device may include information on a synchronization period or a synchronization time point of various data of the electronic device.

The data type of location information or supplemental location information represents a data type of location information or supplemental location information that may be obtained by an electronic device during a positioning process. For example, the data type of location information or supplemental location information may indicate that location information may be obtained in the form of coordinates or location information may be obtained in the form of a moving direction or a distance traveled such as PDR information. Alternatively, the data type of location information or supplemental location information may indicate that information on a Bluetooth low energy (BLE) beacon around an electronic device received through BLE may be provided as supplemental location information.

The current positioning means information may represent information on current availability of a positioning means included in an electronic device. For example, a positioning means that is unable to be used or is difficult to use due to a current location, a battery state, or a user command may be excluded among positioning means included in an electronic device. The current positioning means information represents information indicating a current state of being unable to be used or difficult to use. A positioning means may be considered difficult to use when it is available for use by a device, but its use by the device would result in the device failing to satisfy a particular power consumption/efficiency goal and/or accuracy goal.

The state information of an electronic device may include information indicating a state or performance of the electronic device such as an on/off state, a sleep/active state, a remaining capacity of a battery, whether or not the battery is charged, processor's performance, memory space, or the like. Furthermore, the state information of an electronic device may include information identifying a set time in the case where a time at which the electronic device is turned on/off or enters a sleep/active mode is set.

The main electronic device 100 may request the peripheral electronic device 200 to send a positioning profile of the peripheral electronic device 200, and may receive the positioning profile in response. Accordingly, the main electronic device 100 may integrate the positioning profiles of the main electronic device 100 and the peripheral electronic device 200 to manage the positioning profiles.

According to an embodiment of the present disclosure, the main electronic device 100 may transmit its positioning profile to the peripheral electronic device 200. Accordingly, each of the main electronic device 100 and the peripheral electronic device 200 may share and manage the positioning profiles of all electronic devices.

According to an embodiment of the present disclosure, upon receiving the positioning profile from the peripheral electronic device 200, the main electronic device 100 may determine whether cooperative positioning is possible on the basis of the positioning profiles of the main electronic device 100 and the peripheral electronic device 200. If it is determined that cooperative positioning is possible, the positioning profile received from the peripheral electronic device 200 may be stored and managed together with the positioning profile of the main electronic device 100.

According to an embodiment of the present disclosure, if it is determined that only some of the peripheral electronic devices 200-1 to 200-3 are available for cooperative positioning, the main electronic device 100 may store and manage only the positioning profiles of only those peripheral electronic devices that are available.

According to an embodiment of the present disclosure, the main electronic device 100 or the peripheral electronic device 200 may transmit/receive the positioning profile after being connected to a network. According to another embodiment of the present disclosure, the main electronic device 100 or the peripheral electronic device 200 may transmit/receive the positioning profile before being connected to a network. For example, the positioning profile may be added to a beacon signal transmitted/received during a network connection process so that the positioning profile is transmitted.

According to an embodiment of the present disclosure, if the positioning profile is changed, the main electronic device 100 or the peripheral electronic device 200 may update the positioning profile. For example, if the positioning profile of the main electronic device 100 is changed or a changed positioning profile is received from the peripheral electronic device 200, the electronic device 100 may update the positioning profile.

A change in the positioning profile may include, for example, turning on/off of a positioning means by a user, a change in a remaining capacity of a battery, release of a network connection, switching to a sleep mode, a location change of an electronic device, or the like.

According to an embodiment of the present disclosure, if the positioning profile of the device 100 or device 200 is updated, the main electronic device 100 may determine whether synchronization of the updated positioning profile is required with the rest of the network. For example, in the case where a change of the positioning profile may affect cooperative positioning, it may be determined that synchronization of the positioning profile is required. For example, in the case where the state of the peripheral electronic device 200 that has a unique positioning means within a network is changed from an insufficient battery power state (e.g., a state in in which the remaining battery power of the device 200 fails to meet a threshold) to a positioning-enabled battery state (e.g., a state in in which the remaining battery power of the device 200 meets the threshold), it may be determined that synchronization of the positioning profile is required. However, in some instances, when at least one of the peripheral electronic devices 200-1 to 200-3 transitions from an insufficient battery power state to a positioning-enabled battery state, it may be determined that the synchronization is not required if the other electronic devices have the same positioning means. For another example, in the case where a specific electronic device enters a sleep mode, the electronic device may update the positioning profile and may perform synchronization immediately before entering the sleep mode.

According to an embodiment of the present disclosure, the main electronic device 100 or the peripheral electronic device 200 may delete at least one of the positioning profiles that are stored in the memory of the main electronic device 100. For example, if a certain electronic device is determined as not being necessary for cooperative positioning or is excluded by the user, the positioning profile of the electronic device may be deleted. Therefore, unnecessary use of a memory may be prevented.

If a positioning event occurs, the main electronic device 100 may determine positioning roles of the main electronic device 100 and the peripheral electronic device 200 on the basis of the positioning profile. The positioning event may be, for example, user's manipulation, geo-fence entry/exit, change of a remaining battery capacity, change of the positioning profile, or the like. For example, the positioning event may include the case where a remaining battery capacity of the main electronic device 100 decreases to a specified capacity level or lower, the case where the remaining battery capacity of the peripheral electronic device 200 is higher than that of the main electronic device 100, or the case where a function that requires high battery power consumption is performed in the main electronic device 100. For another example, the positioning event may include the case where an available positioning means is turned off or information required for positioning is not received normally. For another example, the positioning event may include the case where the main electronic device 100 or the peripheral electronic device 200 enters a sleep mode.

According to an embodiment of the present disclosure, when determining positioning roles, the main electronic device 100 may check whether the positioning profile is valid. For example, if a specified time or a longer time has elapsed since the last update of the positioning profile, it may be determined that the positioning profile is not valid. If it is determined that the positioning profile is not valid, the main electronic device 100 may update the positioning profile of the main electronic device 100 or the peripheral electronic device 200. Alternatively, if it is determined that the positioning profile is not valid, the main electronic device 100 may request currently available positioning means information from the peripheral electronic device 200.

According to an embodiment of the present disclosure, when determining positioning roles, the main electronic device 100 may specify an electronic device that is to perform positioning and a positioning means that is to be used by the specified electronic device when performing the positioning. According to another embodiment of the present disclosure, when determining positioning roles, the main electronic device 100 may specify only an electronic device that is to perform positioning and may not specify a positioning means of the electronic device. In the case where a positioning means is not specified, the electronic device designated to perform positioning may perform positioning using at least some of its available positioning means.

For example, when the main electronic device 100 determines that the third peripheral electronic device 200-3 should perform GPS positioning, the main electronic device 100 may provide, to the third peripheral electronic device 200-3, A-GPS information, electronic map database information of a specific region, and Wi-Fi AP scanning information. In addition, the second peripheral electronic device 200-2 may provide VLC information to the third peripheral electronic device 200-3, and the first peripheral electronic device 200-1 may provide PDR information to the third peripheral electronic device 200-3.

According to an embodiment of the present disclosure, the main electronic device 100 may determine positioning roles according to a positioning purpose. According to an embodiment of the present disclosure, the main electronic device 100 may determine positioning roles so that power consumption of the main electronic device 100 or the peripheral electronic device 200 is minimized. According to an embodiment of the present disclosure, the main electronic device 100 may determine positioning roles so that an error in location information obtained through positioning is minimized. According to an embodiment of the present disclosure, the main electronic device 100 may determine positioning roles so that a time required for positioning is minimized.

The main electronic device 100 or the peripheral electronic devices 200-1 to 200-3 may perform positioning according to determined positioning roles. For example, the main electronic device 100 may provide, to the third peripheral electronic device 200-3, the A-GPS information, the electronic map database information of a specific region, and the Wi-Fi AP scanning information, and the second peripheral electronic device 200-2 may provide the VLC information to the third peripheral electronic device 200-3. The first peripheral electronic device 200-1 may provide the PDR information to the third peripheral electronic device 200-3. The third peripheral electronic device 200-3 may perform positioning using the information received from the main electronic device 100 and the first and second peripheral electronic devices 200-1 and 200-2. For example, the third peripheral electronic device 200-3 may perform GPS positioning using the A-GPS information. Furthermore, the third peripheral electronic device 200-3 may obtain detailed information (e.g., an address, a URL, event information, or the like) of a specific location using the electronic map database information. If the GPS positioning is unable to be performed, the PDR information may be used to mark a current location on a map. In addition, an indoor location may be determined using the Wi-Fi AP scanning information.

According to an embodiment of the present disclosure, the main electronic device 100 may transmit, to the peripheral electronic devices 200-1 to 200-3, control signals (e.g., a control signal for requesting location information or supplemental location information) corresponding to the determined positioning roles, and the peripheral electronic devices 200-1 to 200-3 may perform positioning according to the control signals received from the main electronic device 100.

Although it has been described that the main electronic device 100 determines positioning roles, the peripheral electronic device 200 that shares the positioning profile with another electronic device may also determine positioning roles according to an embodiment of the present disclosure.

Figure 2:
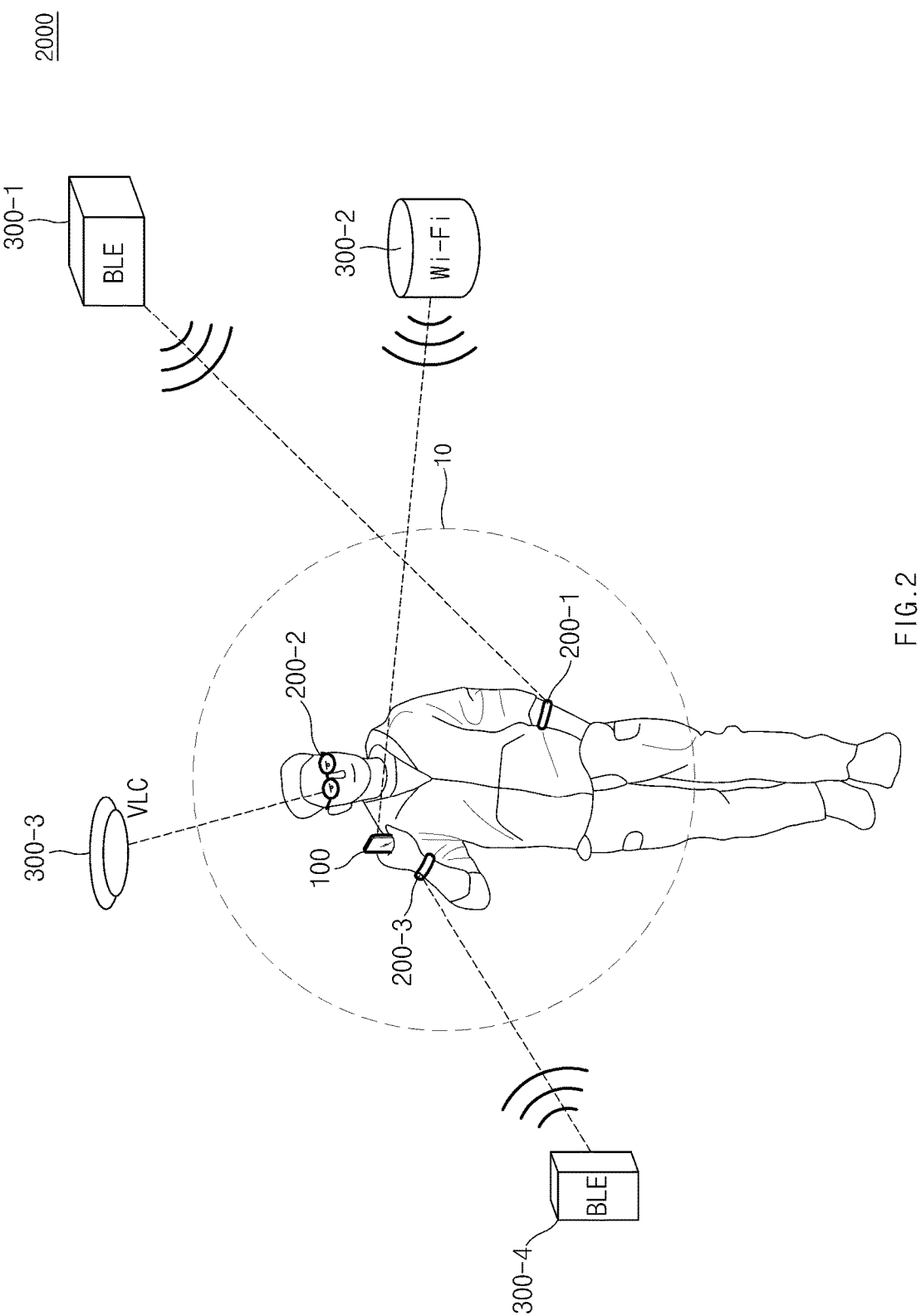
FIG. 2 is a diagram illustrating another example of a positioning system, according to various embodiments of the present disclosure.

FIG. 2 is a diagram illustrating another example of a positioning system, according to various embodiments of the present disclosure.

Referring to FIG. 2, a positioning system 2000 may include the main electronic device 100, the peripheral electronic devices 200-1 to 200-3, and at least one external electronic devices 300-1 to 300-4. According to an embodiment of the present disclosure, the main electronic device 100 and the peripheral electronic devices 200-1 to 200-3 may be part of the network 10. The external electronic devices 300-1, 300-2, 300-3, and 300-4 may be included in a network different from the network 10. The peripheral electronic devices or the external electronic devices are may be referred to a counterpart device. In other word, the counterpart device may be the peripheral electronic or the external electronic device.

According to an embodiment of the present disclosure, the inner network 10 may include a portable electronic device and a wearable electronic device.

According to an embodiment of the present disclosure, any of the external electronic devices 300 may include an infrastructure device such as a smart lamp (with VLC), NFC/RFID, a camera, an ultrasonic transmitter, a Wi-Fi AP, or a BLE/Wi-Fi beaconing device fixed to a structure such as a shopping center or the like.

The electronic devices 100 and 200 included in the inner network may identify a connectable external electronic device on the basis of the positioning profile.

At least one of the main electronic device 100 and the peripheral electronic devices 200 may be connected to any of the external electronic devices 300. FIG. 2 illustrates an example of a connection between electronic devices. The main electronic device 100 may be connected to an AP 300-2, and may receive Wi-Fi beacon information. The third peripheral electronic device 200-3 may be connected to an RFID reader 300-4. The second peripheral electronic device 200-2 may be connected to a VLC device 300-3, and may receive VLC information. The first peripheral electronic device 200-1 may receive BLE beacon information from a BLE device 300-1.

The electronic devices 100 and 200 included in the network 10 may share information received from the external electronic devices 300 with other electronic devices included in the network 10.

Figure 3:
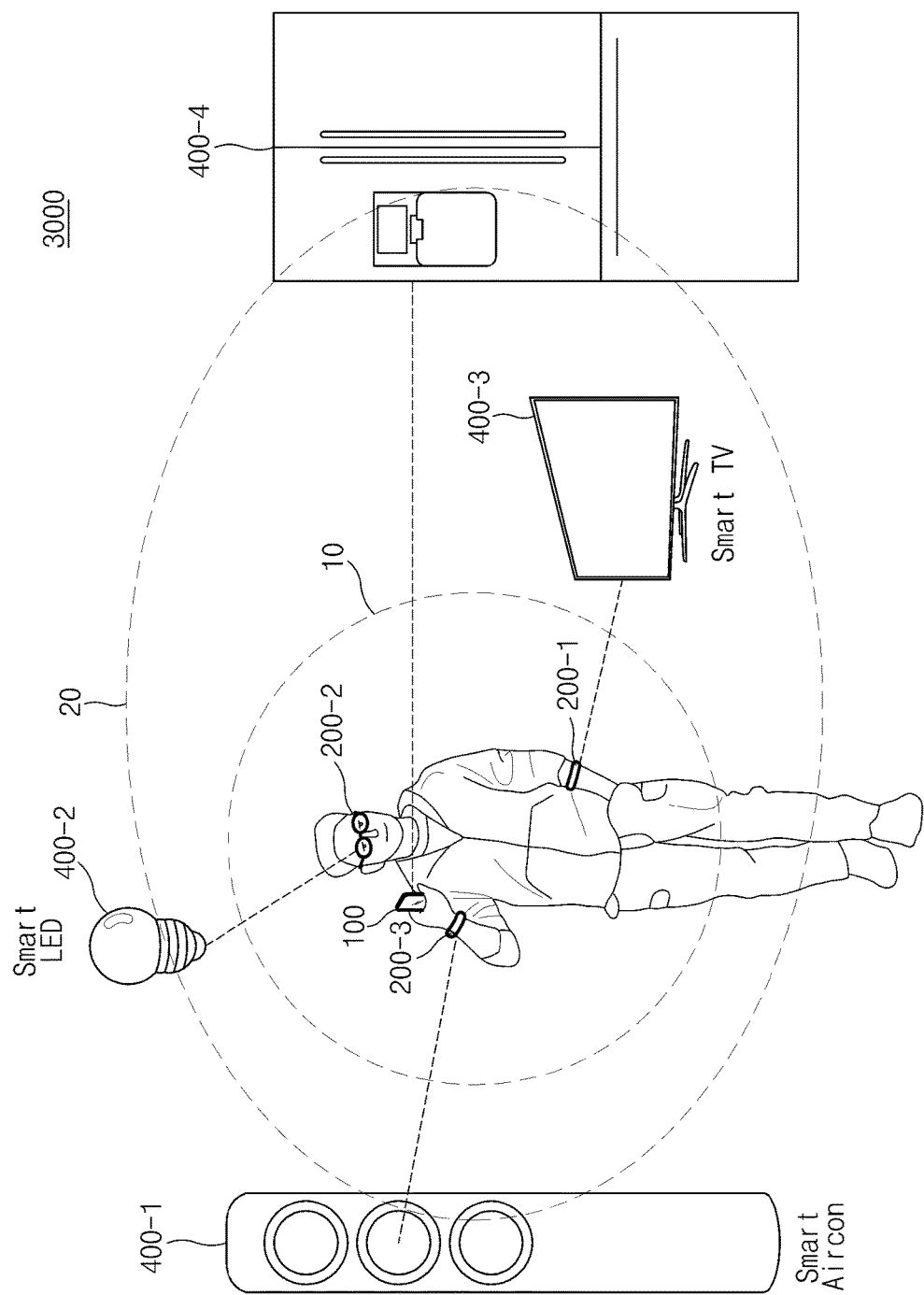
FIG. 3 is a diagram illustrating yet another example of a positioning system, according to various embodiments of the present disclosure.

FIG. 3 is a diagram illustrating yet another example of a positioning system, according to various embodiments of the present disclosure.

Referring to FIG. 3, a positioning system 3000 may include the main electronic device 100, the peripheral electronic devices 200-1 to 200-3, and at least one external electronic devices 400-1 to 400-4. According to an embodiment of the present disclosure, the main electronic device 100 and the peripheral electronic devices 200-1 to 200-3 may be connected to each other by the network 10. The external electronic devices 400-1 to 400-4 may be connected to each other by a network 20. For example, the network 20 may be a home network. In the example of FIG. 3, the network 10 may is referred to as an inner network and the network 20 that is referred to as an outer network. Although in this example the networks 10 and 20 are described as separate networks, in some implementations the networks 10 and 20 may be different segments of the same network According to an embodiment of the present disclosure, the inner network 10 may include a portable electronic device and a wearable electronic device.

According to an embodiment of the present disclosure, the external electronic device 400 may include an air conditioner, a refrigerator, a TV, or a smart lamp on a home network.

According to an embodiment of the present disclosure, at least one of the main electronic device 100 and the peripheral electronic devices 200 may be connected to any of the external electronic devices 400. At least one of the main electronic device 100 and the peripheral electronic devices 200 may receive positioning information from the external electronic devices 400. For example, the positioning information may include context information of the interior of a house, latitude/longitude information, address information, relevant content information, or the like.

Figure 4:
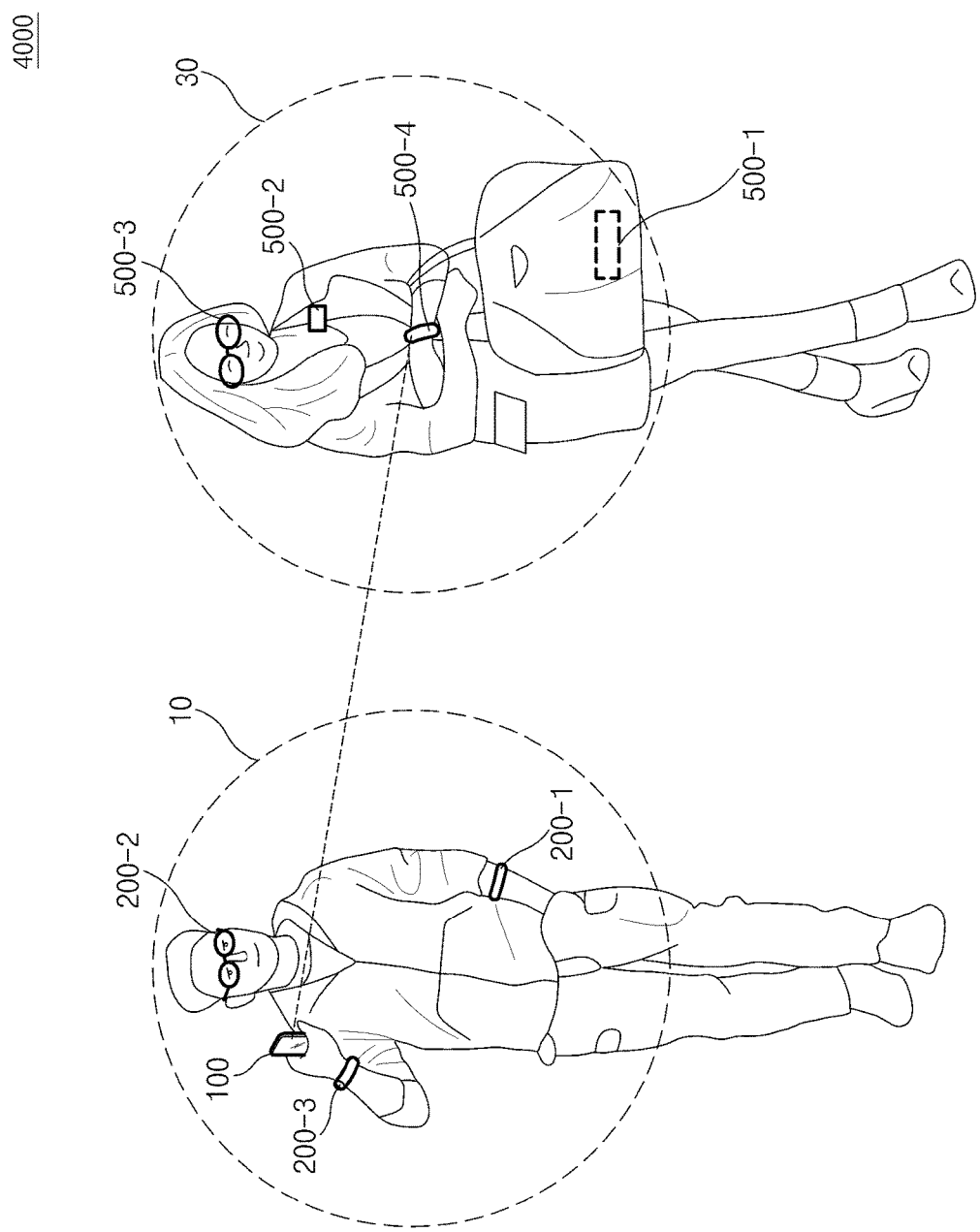
FIG. 4 is a diagram illustrating yet another example of a positioning system, according to various embodiments of the present disclosure.

FIG. 4 is a diagram illustrating yet another example of a positioning system, according to various embodiments of the present disclosure.

Referring to FIG. 4, a positioning system 4000 may include the main electronic device 100, the peripheral electronic devices 200-1 to 200-3, and at least one external electronic devices 500-1 to 500-4. According to an embodiment of the present disclosure, the main electronic device 100 and the peripheral electronic devices 200-1 to 200-3 may be connected to each other by the network 10. The external electronic devices 500-1 to 500-4 may be connected to each other by a network 30.

According to an embodiment of the present disclosure, the networks 10 and 30 may include portable electronic devices and wearable electronic devices.

According to an embodiment of the present disclosure, at least one of the main electronic device 100 and the peripheral electronic devices 200 may be connected to any of the external electronic devices 500. For example, referring to FIG. 4, at least one of the main electronic device 100 and the peripheral electronic devices 200 may transmit/receive positioning information to/from the external electronic devices 500.

Figure 5:
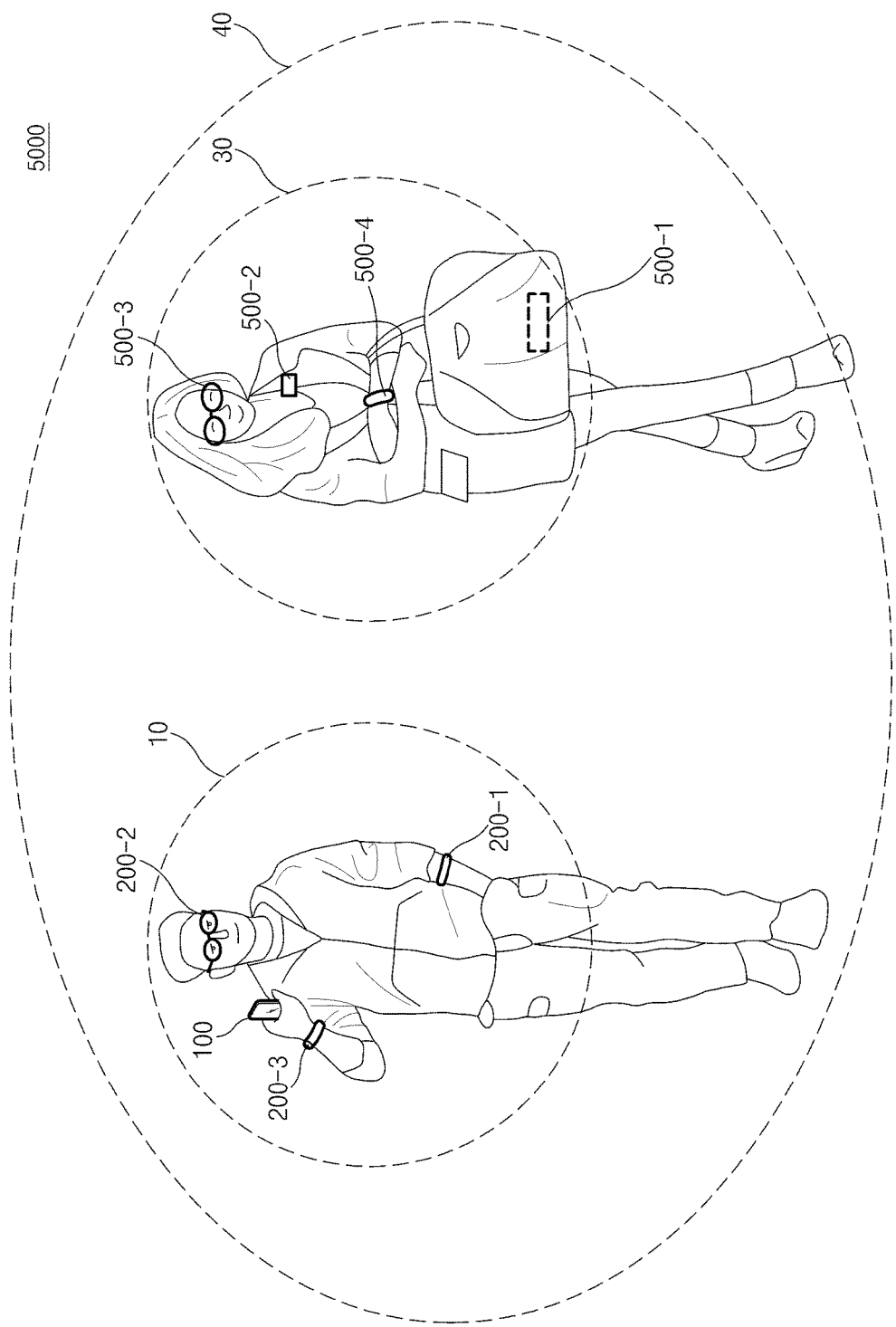
FIG. 5 is a diagram illustrating yet another example of a positioning system, according to various embodiments of the present disclosure.

FIG. 5 is a diagram illustrating yet another example of a positioning system, according to various embodiments of the present disclosure.

Referring to FIG. 5, the networks 10 and 30 of FIG. 3 may form one massive network 40. In the massive network 40, the external electronic devices 500 may operate in a similar manner as the peripheral electronic device 200 with respect to the main electronic device 100.

The electronic devices 100, 200, and 500 included in the massive network 40 may share the positioning profiles and their positioning roles may be determined (e.g., by the electronic device 100) on the basis of the positioning profiles as described above with reference to FIG. 1.

If it is determined that the network 10 is spaced apart from the network 30 by at least a certain distance on the basis of a signal strength between the networks, a connection to the massive network 40 is released so that the networks 10 and 20 may operate as individual networks.

According to an embodiment of the present disclosure, the main electronic device 100 and the peripheral electronic device 200 illustrated in FIGS. 1 to 5 may form a car network together with various electronic devices included in a car so as to perform cooperative positioning. For example, the car network may include smart glasses that are worn by a driver, a smartwatch device, a smart band, a smartphone carried by the driver, and a center fascia installed in a car.

The electronic devices included in the car network may have different positioning means and information. For example, the smart glasses may perform positioning based on images obtained by their camera. The smartwatch may perform GPS positioning, A-GPS information reception, and Wi-Fi scanning. The smartphone may perform GPS positioning, A-GPS information reception, off-board map information reception, and Wi-Fi scanning. The center fascia may use GPS positioning, odometer information, camera photographing information, onboard map information, or the like.

According to an embodiment of the present disclosure, the center fascia may be supplied with power from the car and as such it may have a readily available power supply. This may permit the central fascia to perform GPS positioning that requires high power consumption. In the case where the center fascia does not support external networking, the center fascia may receive the A-GPS information from the smartphone that supports external networking, so as to perform positioning quickly. Furthermore, the center fascia may receive the off-board map information from the smartphone, so as to receive up-to-date map information for driving and relevant traffic information. Moreover, the center fascia may receive, from the smartphone, the Wi-Fi scanning information for use in an area where GPS is not available such as an underground parking lot, a tunnel, or the like.

According to an embodiment of the present disclosure, if a battery capacity of the smartphone is equal to or lower than a certain level, a subject from which location information is to be received may be changed so that A-GPS information and the Wi-Fi scanning information may be received from the smartwatch.

Figure 6:
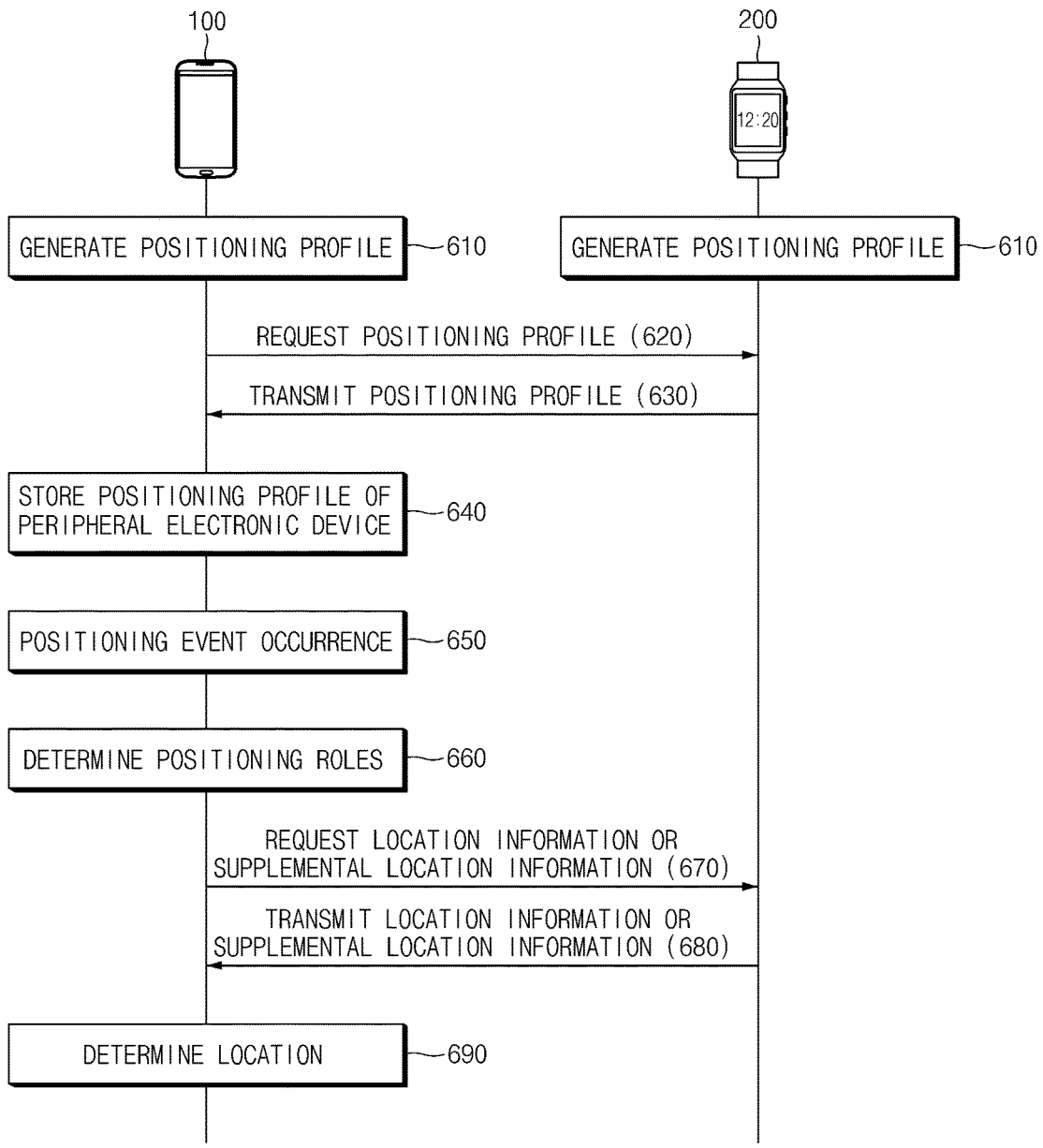
FIG. 6 is a sequence diagram of an example of a process, according to various embodiments of the present disclosure.

FIG. 6 is a sequence diagram of an example of a process, according to various embodiments of the present disclosure.

As described above, the positioning system may include at least one counterpart device (or second electronic device) (e.g., peripheral electronic device or external electronic device), but, for convenience, operation of the main electronic device 100 and one peripheral electronic device 200 is described below.

Referring to FIG. 6, the main electronic device 100 and the peripheral electronic devices 200 may generate a positioning profile in operation 610. The positioning profile may include information required to be exchanged between the electronic devices for cooperative positioning (positioning through cooperation between a specific electronic device and another electronic device adjacent thereto). According to an embodiment of the present disclosure, the positioning profile may include at least one of positioning means information of an electronic device, location information measured currently or previously by a positioning means, supplemental location information for each positioning means, current positioning means information of an electronic device, priority information of a positioning means, data synchronization information of an electronic device, data type of location information or supplemental location information, or state information of an electronic device.

If the positioning profile is generated, the main electronic device 100 may request the positioning profile from the peripheral electronic device 200 in operation 620. According to an embodiment of the present disclosure, when the main electronic device 100 requests the positioning profile from the peripheral electronic device 200, the main electronic device 100 requests the positioning profile using a broadcasting method. For example, the main electronic device 100 may transmit a beacon signal for requesting the positioning profile using the broadcasting method. Upon receiving the positioning profile request from the main electronic device 100, the peripheral electronic device 200 may transmit the positioning profile to the main electronic device 100 in operation 630.

Upon receiving the positioning profile of the peripheral electronic device 200 therefrom, the main electronic device 100 may store the positioning profile of the peripheral electronic device 200 in operation 640. According to an embodiment of the present disclosure, upon receiving the positioning profile of the peripheral electronic device 200, the main electronic device 100 may determine whether cooperative positioning is possible on the basis of the positioning profiles of the main electronic device 100 and the peripheral electronic device 200. According to an embodiment of the present disclosure, if it is determined that cooperative positioning is possible, the main electronic device 100 may store the positioning profile received from the peripheral electronic device 200 and may manage it together with the positioning profile of the main electronic device 100.

According to an embodiment of the present disclosure, if it is determined that only some (e.g., one or more) of the peripheral electronic devices 200-1 to 200-3 are available for cooperative positioning, only the positioning profiles of those device(s) that are available for cooperative positioning may be stored and managed.

According to an embodiment of the present disclosure, if the positioning profile is changed, the main electronic device 100 or the peripheral electronic device 200 may update the positioning profile. For example, if the positioning profile of the main electronic device 100 is changed or a changed positioning profile is received from the peripheral electronic device 200, the electronic device 100 may update the positioning profile.

According to an embodiment of the present disclosure, if the positioning profile is updated, the main electronic device 100 may determine whether synchronization of the updated positioning profile is required. For example, in the case where a change of the positioning profile may affect cooperative positioning, it may be determined that synchronization of the positioning profile is required. If it is determined that synchronization of the positioning profile is required, the main electronic device 100 may synchronize the positioning profile with that of the peripheral electronic device 200.

If a positioning event occurs in operation 650, the main electronic device 100 may determine positioning roles of the main electronic device 100 and the peripheral electronic device 200 on the basis of the positioning profile in operation 660. The positioning event may be, for example, user's manipulation, geo-fence entry/exit, change of a remaining battery capacity, change of the positioning profile, or the like.

According to an embodiment of the present disclosure, when determining positioning roles, the main electronic device 100 may check whether the positioning profile is valid. For example, if a specified time or a longer time has elapsed since the last update of the positioning profile, it may be determined that the positioning profile is not valid. If it is determined that the positioning profile is not valid, the main electronic device 100 may update the positioning profile of the main electronic device 100 or the peripheral electronic device 200. Alternatively, if it is determined that the positioning profile is not valid, the main electronic device 100 may request and receive currently available positioning means information from the peripheral electronic device 200.

According to an embodiment of the present disclosure, the main electronic device 100 may determine positioning roles according to a positioning purpose According to an embodiment of the present disclosure, the main electronic device 100 may determine positioning roles so that power consumption of the main electronic device 100 or the peripheral electronic device 200 is minimized. Thus, the main electronic device 100 may use a measure of the power consumption of at least one of a positioning means that is available in the electronic device 100 and a measure of the accuracy of a positioning means that is available in another device as a basis for assigning positioning roles to the main electronic device 100 and/or the other device.

According to an embodiment of the present disclosure, the main electronic device 100 may determine positioning roles so that an error in location information obtained through positioning is minimized. Thus, for example, the main electronic device 100 may use a measure of the accuracy of at least one of a positioning means that is available in the electronic device 100 and a measure of the accuracy of a positioning means that is available in another device as a basis for assigning positioning roles to the main electronic device 100 and/or the other device.

According to an embodiment of the present disclosure, the main electronic device 100 may determine positioning roles so that a time required for positioning is minimized. Thus, for example, the main electronic device 100 may use a measure of the speed at which at least one of a positioning means that is available in the electronic device 100 can determine the location of the electronic device 100 and a measure of the speed at which a positioning means that is available in another device can determine the location of the other device as a basis for assigning positioning roles to the main electronic device 100 and/or the other device.

According to an embodiment of the present disclosure, when determining positioning roles, the main electronic device 100 may specify a positioning means of a specific electronic device. According to an embodiment of the present disclosure, when determining positioning roles, the main electronic device 100 may specify only an electronic device that is to perform positioning and may not specify a positioning means of the electronic device. In the case where a positioning means is not specified, the electronic device designated to perform positioning may perform positioning using one or more of those positioning means that are available.

If the positioning roles are determined, the main electronic device 100 may request required information from the peripheral electronic device 200 according to the positioning roles in operation 670. The peripheral electronic device 200 may transmit the requested information in response to the request of the main electronic device 100 in operation 680.

For example, it may be determined that the peripheral electronic device 200 should perform positioning, and the main electronic device 100 should provide supplemental location information required for the positioning performance of the peripheral electronic device 200. Accordingly, the main electronic device 100 may request the peripheral electronic device 200 to send location information obtained by the peripheral electronic device 200. According to an embodiment of the present disclosure, the main electronic device 100 may provide supplemental location information required for positioning before requesting the location information from the supplemental electronic device 200. According to another embodiment of the present disclosure, when sending the request for the location information, the main electronic device 100 may transmit the supplemental location information required for positioning together with the request. The peripheral electronic device 200 may perform positioning in response to the request of the main electronic device 100, and may transmit the location information to the main electronic device 100. The peripheral electronic device 200 may transmit the obtained location information to the main electronic device 100 only once. According to an embodiment of the present disclosure, the peripheral electronic device 200 may periodically perform positioning in response to a request of the main electronic device 100, and may transmit the obtained location information periodically.

For another example, it may be determined that the main electronic device 100 should perform positioning, and the peripheral electronic device 200 should provide supplemental location information required for the positioning performance of the main electronic device 100. Accordingly, the main electronic device 100 may send a request for the supplemental location information required for positioning to the peripheral electronic device 200. The peripheral electronic device 200 may transmit the supplemental location information to the main electronic device 100 in response to the request of the main electronic device 100.

Upon receiving the location information or the supplemental location information from the peripheral electronic device 200, the main electronic device 100 may determine a location of the electronic device 100 using the received location information or supplemental location information in operation 690. For example, the main electronic device 100 may determine the location information received from the peripheral electronic device 200 as the location of the main electronic device 100. For another example, the main electronic device 100 may determine the location of the main electronic device 100 using the location information received from the peripheral electronic device 200 and location information obtained by the main electronic device 100 using another positioning means. For another example, the main electronic device 100 may perform positioning using the supplemental location information received from the peripheral electronic device 200, and may determine a location information obtained as a result of the positioning as the location of the main electronic device 100.

Figure 7:
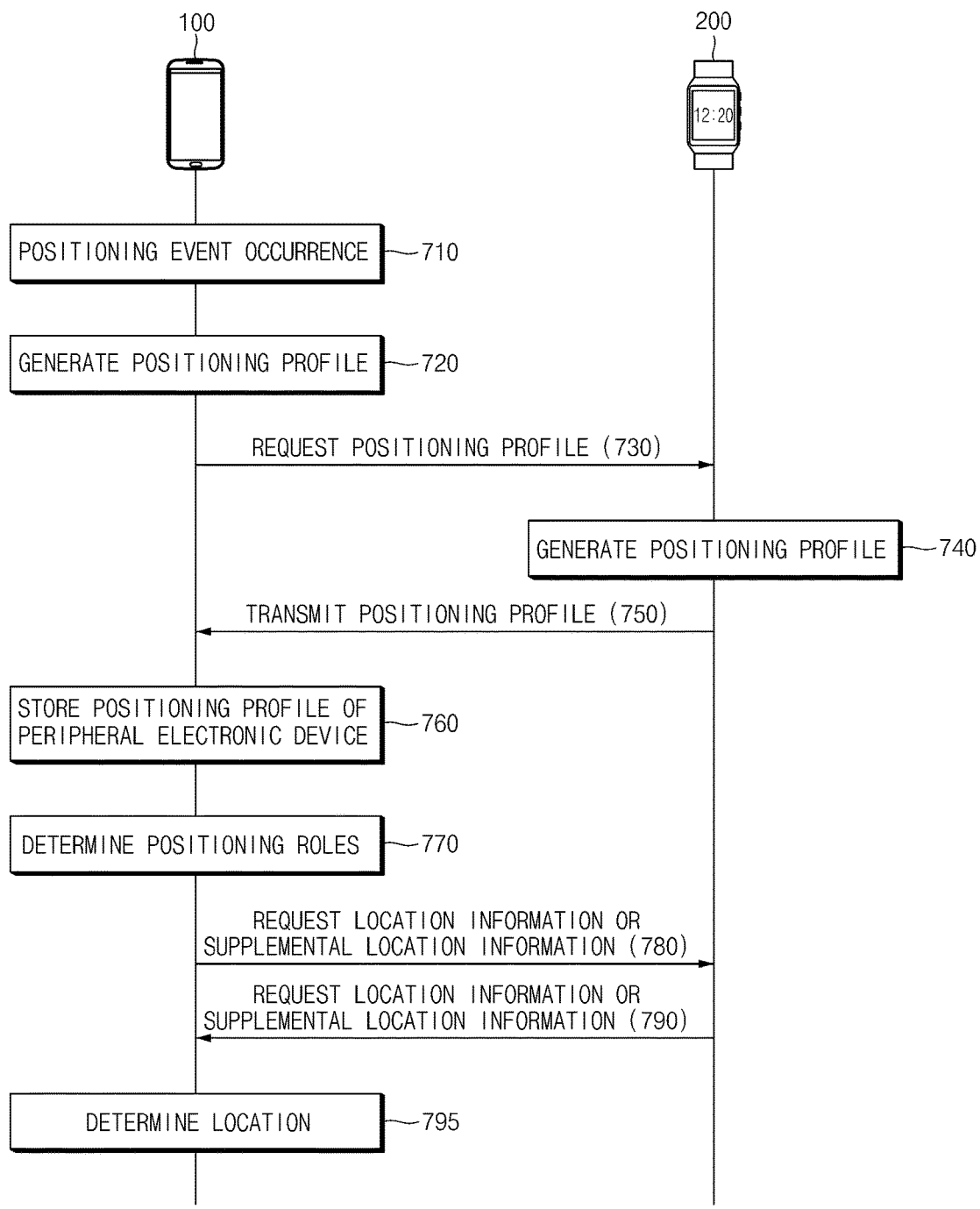
FIG. 7 is a sequence diagram of another example of a process, according to various embodiments of the present disclosure.

FIG. 7 is a sequence diagram of another example of a process, according to various embodiments of the present disclosure.

If a positioning event occurs in operation 710, the main electronic device 100 may generate a positioning profile in operation 720.

If the positioning event occurs in operation 710, the main electronic device 100 may request the positioning profile from the peripheral electronic device 200 in operation 730. According to an embodiment of the present disclosure, when the main electronic device 100 requests the positioning profile from the peripheral electronic device 200, the main electronic device 100 requests the positioning profile using a broadcasting method. For example, the main electronic device 100 may transmit a beacon signal requesting the positioning profile.

Upon receiving the positioning profile request from the main electronic device 100, the peripheral electronic device 200 may generate the positioning profile in operation 740. If the positioning profile is generated, the peripheral electronic device 200 may transmit the positioning profile to the main electronic device 100 in operation 750.

Upon receiving the positioning profile of the peripheral electronic device 200 therefrom, the main electronic device 100 may store the positioning profile of the peripheral electronic device 200 in operation 760.

The main electronic device 100 may determine positioning roles of the main electronic device 100 and the peripheral electronic device 200 on the basis of the positioning profile in operation 770. According to an embodiment of the present disclosure, when determining positioning roles, the main electronic device 100 may check whether the positioning profile is valid. For example, if a specified time or a longer time has elapsed since the last update of the positioning profile, it may be determined that the positioning profile is not valid. If it is determined that the positioning profile is not valid, the main electronic device 100 may update the positioning profile of the main electronic device 100 or the peripheral electronic device 200. Alternatively, if it is determined that the positioning profile is not valid, the main electronic device 100 may request and receive currently available positioning means information from the peripheral electronic device 200.

According to an embodiment of the present disclosure, the main electronic device 100 may determine positioning roles according to a positioning purpose. According to an embodiment of the present disclosure, the main electronic device 100 may determine positioning roles so that power consumption of the main electronic device 100 or the peripheral electronic device 200 is minimized. According to an embodiment of the present disclosure, the main electronic device 100 may determine positioning roles so that an error in location information obtained through positioning is minimized. According to an embodiment of the present disclosure, the main electronic device 100 may determine positioning roles so that a time required for positioning is minimized.

According to an embodiment of the present disclosure, when determining positioning roles, the main electronic device 100 may specify a positioning means of a specific electronic device. According to an embodiment of the present disclosure, when determining positioning roles, the main electronic device 100 may specify only an electronic device that is to perform positioning and may not specify a positioning means of the electronic device. In the case where a positioning means is not specified, the electronic device designated to perform positioning may perform positioning using at least one of the positioning means that are available in that device.

If the positioning roles are determined, the main electronic device 100 may request required information from the peripheral electronic device 200 according to the positioning roles in operation 780. The peripheral electronic device 200 may transmit the requested information in response to the request of the main electronic device 100 in operation 790.

For example, it may be determined that the peripheral electronic device 200 should perform positioning, and the main electronic device 100 should provide supplemental location information required for the positioning performance of the peripheral electronic device 200. Accordingly, the main electronic device 100 may request the peripheral electronic device 200 to send location information obtained by the peripheral electronic device 200. According to an embodiment of the present disclosure, the main electronic device 100 may provide supplemental location information required for positioning before requesting the location information from the supplemental electronic device 200.

According to another embodiment of the present disclosure, when sending the request for the location information, the main electronic device 100 may transmit the supplemental location information required for positioning together with the request. The peripheral electronic device 200 may perform positioning in response to the request of the main electronic device 100, and may transmit the location information to the main electronic device 100. The peripheral electronic device 200 may transmit the obtained location information to the main electronic device 100 only once. According to an embodiment of the present disclosure, the peripheral electronic device 200 may periodically perform positioning in response to a request of the main electronic device 100, and may transmit the obtained location information periodically.

For another example, it may be determined that the main electronic device 100 should perform positioning, and the peripheral electronic device 200 should provide supplemental location information required for the positioning performance of the main electronic device 100. Accordingly, the main electronic device 100 may send a request for the supplemental location information required for positioning to the peripheral electronic device 200. The peripheral electronic device 200 may transmit the supplemental location information to the main electronic device 100 in response to the request of the main electronic device 100.

Upon receiving the location information or the supplemental location information from the peripheral electronic device 200, the main electronic device 100 may determine a location of the electronic device 100 using the received location information or supplemental location information in operation 795. For example, the main electronic device 100 may determine the location information received from the peripheral electronic device 200 as the location of the main electronic device 100. For another example, the main electronic device 100 may determine the location of the main electronic device 100 using the location information received from the peripheral electronic device 200 and location information obtained by the main electronic device 100 using another positioning means. For another example, the main electronic device 100 may perform positioning using the supplemental location information received from the peripheral electronic device 200, and may use both types of location information to determine the location of the main electronic device 100.

Figure 8:
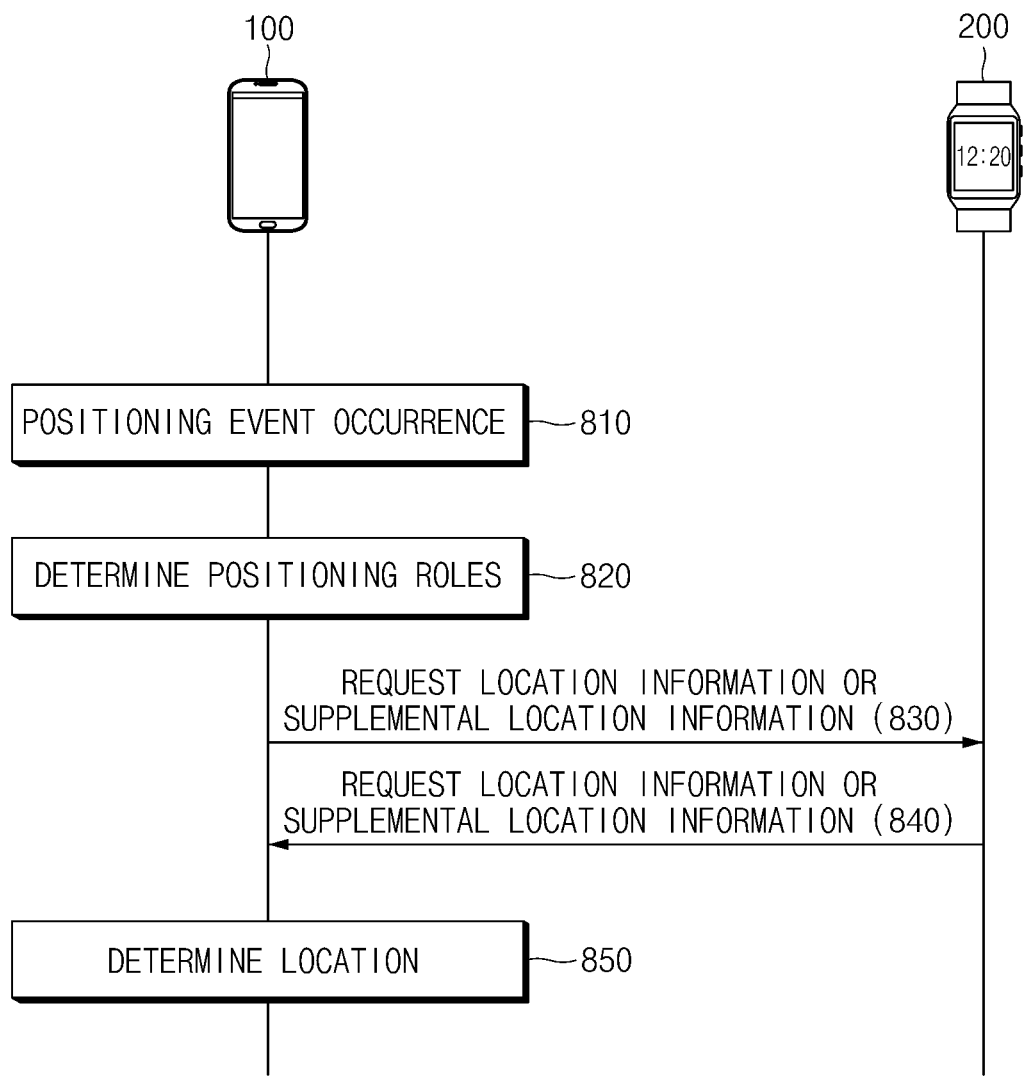
FIG. 8 is a sequence diagram of yet another example of a process, according to various embodiments of the present disclosure.

FIG. 8 is a sequence diagram of yet another example of a process, according to various embodiments of the present disclosure.

Referring to FIG. 8, if a positioning event occurs in operation 810, the main electronic device 100 may determine positioning roles in operation 820. According to an embodiment of the present disclosure, the main electronic device 100 may determine positioning roles without the positioning profile of the peripheral electronic device 200. For example, in the case where the positioning event occurs, but the main electronic device 100 does not have a currently available positioning means, the main electronic device 100 may determine that the main electronic device 100 should not perform positioning and a selected one of the peripheral electronic devices 200 should perform the positioning instead. For another example, it may be determined that the main electronic device 100 should perform positioning, and a selected one of the peripheral electronic devices 200 should provide supplemental location information to the main electronic device 100.

If the positioning roles are determined, the main electronic device 100 may send a request for location information or supplemental location information to the peripheral electronic device 200 in operation 830. According to an embodiment of the present disclosure, the main electronic device 100 may request the location information or the supplemental location information using a broadcasting method. For example, the main electronic device 100 may transmit a beacon signal for requesting the location information or the supplemental location information using the broadcasting method. Since the main electronic device 100 does not have the positioning profile of the peripheral electronic device 200, the main electronic device 100 may request required information (e.g., location information or supplemental location information) from a peripheral electronic device 200 adjacent to the main electronic device 100 using the broadcasting method.

The peripheral electronic device 200 may transmit the location information or the supplemental location information to the main electronic device 100 in response to the request of the main electronic device 100 in operation 840. According to an embodiment of the present disclosure, if the peripheral electronic device 200 has or is able to obtain the location information or the supplemental location information requested by the main electronic device 100, the peripheral electronic device 200 may transmit the location information or the supplemental location information to the main electronic device 100.

Upon receiving the location information or the supplemental location information from the peripheral electronic device 200, the main electronic device 100 may determine a location of the electronic device 100 using the received location information or supplemental location information in operation 850.

Figure 9:
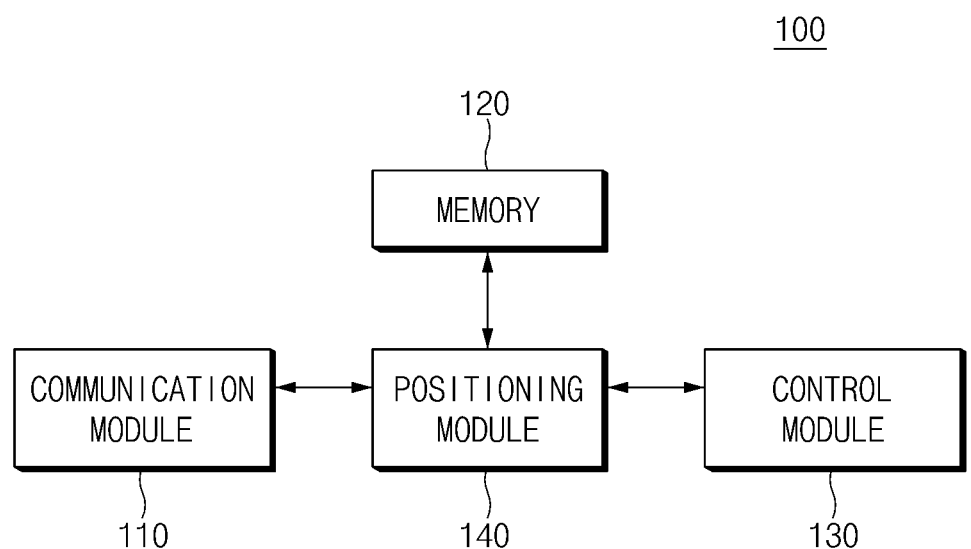
FIG. 9 is a block diagram of an example of a main electronic device, according to various embodiments of the present disclosure.

FIG. 9 is a block diagram of an example of a main electronic device, according to various embodiments of the present disclosure.

Referring to FIG. 9, the main electronic device 100 may include a communication module 110, a memory 120, a positioning module 130, and a control module 140.

The communication module 110 may communicate with the peripheral electronic device 200 (including the external electronic devices of FIGS. 2 to 5). According to an embodiment of the present disclosure, the communication module 110 may be connected to the peripheral electronic device 200 via a wireless network so as to communicate with the peripheral electronic device 200.

According to an embodiment of the present disclosure, the communication module 110 may transmit/receive various information required for positioning (e.g., a positioning profile, location information, supplemental location information, or the like) to/from the peripheral electronic device 200.

According to an embodiment of the present disclosure, the communication module 110 may transmit/receive the positioning profile after being connected to the peripheral electronic device 200 via the network. According to another embodiment of the present disclosure, the communication module 110 may transmit/receive the positioning profile before the main electronic device 100 or the peripheral electronic device 200 is connected by the network. For example, the positioning profile may be added to a beacon signal transmitted/received during a network connection process so that the positioning profile is transmitted.

The memory 120 may include any suitable type of volatile or non-volatile memory, such as Random Access Memory (RAM), Read-Only Memory (ROM), Network Accessible Storage (NAS), cloud storage, a Solid State Drive (SSD), etc. The memory 120 may store the positioning profile. For example, the memory 120 may store the positioning profiles of the main electronic device 100 and the peripheral electronic device 200. According to an embodiment of the present disclosure, the positioning profile may include at least one of positioning means information of the electronic device 100 or 200, location information measured currently or previously by a positioning means, supplemental location information for each positioning means, current positioning means information of the electronic device, priority information of a positioning means, data synchronization information of the electronic device, data type of location information or supplemental location information, or state information of the electronic device.

The positioning module 130 may obtain location information of the main electronic device 100 or the peripheral electronic device 200 by performing positioning. According to an embodiment of the present disclosure, the positioning module 130 may include a module capable of performing at least one of global navigation satellite system (GNSS) positioning (e.g., such as a GPS receiver), Wi-Fi positioning system (WPS) positioning (e.g., such as a WiFi transceiver), PDR positioning, cell positioning, VLC positioning, earth's magnetic field positioning, ultrasonic positioning, Bluetooth positioning (e.g., such as a Bluetooth transceiver), infrared (IrDA) positioning, simultaneous localization and mapping (SLAM) positioning, ultra-wideband (UWB) positioning, RFID positioning, or fingerprint positioning.

The control module 140 may include any suitable type of processing circuitry, such as one or more general purpose processors (e.g., ARM-based processors), a Digital Signal Processor (DSP), a Programmable Logic Device (PLD), an Application-Specific Integrated Circuit (ASIC), a Field-Programmable Gate Array (FPGA), etc. The control module 140 may control the overall operation of the main electronic device 100. According to an embodiment of the present disclosure, the control module 140 may control each of the communication module 110, the memory 120, and the positioning module 130 so that cooperative positioning is performed in cooperation with the peripheral electronic device 200 according to various embodiments of the present disclosure.

The control module 140 may generate or manage the positioning profile. According to an embodiment of the present disclosure, the control module 140 may generate the positioning profile and may transfer the positioning profile to the peripheral electronic device 200. According to an embodiment of the present disclosure, the control module 140 may request the peripheral electronic device 200 to send the positioning profile thereof, and may receive the positioning profile therefrom. Therefore, the control module 140 may integrate the positioning profiles of the main electronic device 100 and the peripheral electronic device 200 to manage the positioning profiles.

According to an embodiment of the present disclosure, upon receiving the positioning profile from the peripheral electronic device 200, the control module 140 may determine whether cooperative positioning is possible on the basis of the positioning profiles of the main electronic device 100 and the peripheral electronic device 200. If it is determined that cooperative positioning is possible, the control module 140 may store the positioning profile received from the peripheral electronic device 200 and may manage it together with the positioning profile of the main electronic device 100.

According to an embodiment of the present disclosure, if it is determined that only some of the electronic devices 200 are available for cooperative positioning, the control module 140 may store and manage only the positioning profile of those peripheral electronic devices that are available for cooperative positioning.

According to an embodiment of the present disclosure, if the positioning profile is changed, the control module 140 may update the positioning profile. For example, if the positioning profile of the main electronic device 100 is changed or a changed positioning profile is received from the peripheral electronic device 200, the control module 140 may update the positioning profile.

According to an embodiment of the present disclosure, if the positioning profile is updated, the control module 140 may determine whether synchronization of the updated positioning profile is required. For example, in the case where a change of the positioning profile may affect cooperative positioning, it may be determined that synchronization of the positioning profile is required. If it is determined that synchronization of the positioning profile is required, the control module 140 may transfer the positioning profile to the peripheral electronic device 200 so as to synchronize the positioning profile with that of the peripheral electronic device 200.

According to an embodiment of the present disclosure, the control module 140 may delete at least one of any positioning profiles that might be stored in the memory 12 when a predetermined condition is met. For example, if a certain peripheral electronic device is determined as not being necessary for cooperative positioning or is excluded by the user, the positioning profile of the peripheral electronic device may be deleted. Therefore, unnecessary use of a memory may be prevented.

According to an embodiment of the present disclosure, if a positioning event occurs, the control module may determine positioning roles of the main electronic device 100 and the peripheral electronic device 200 on the basis of the positioning profile. The positioning event may be, for example, user's manipulation, geo-fence entry/exit, change of a remaining battery capacity, change of the positioning profile, or the like.

According to an embodiment of the present disclosure, the control module 140 may determine positioning roles according to a positioning purpose. According to an embodiment of the present disclosure, the control module 140 may determine positioning roles so that power consumption of the main electronic device 100 or the peripheral electronic device 200 is minimized. According to an embodiment of the present disclosure, the control 140 may determine positioning roles so that an error in location information obtained through positioning is minimized. According to an embodiment of the present disclosure, the control module 140 may determine positioning roles so that a time required for positioning is minimized.

According to an embodiment of the present disclosure, when determining positioning roles, the control module 140 may specify a positioning means of a specific electronic device. According to an embodiment of the present disclosure, when determining positioning roles, the control module 140 may specify only an electronic device that is to perform positioning and may not specify a positioning means of the electronic device.

According to an embodiment of the present disclosure, the control module 140 may transmit, to the peripheral electronic devices 200-1 to 200-3, control signals corresponding to the determined positioning roles. For example, if it is determined that the peripheral electronic device 200 should perform positioning, and the main electronic device 100 should provide supplemental location information required for the positioning performance of the peripheral electronic device 200, the control module 140 may provide the supplemental location information to the peripheral electronic device 200 and may send a request for location information thereto. According to an embodiment of the present disclosure, when sending the request for the location information, the control module 140 may transmit the supplemental location information required for positioning together with the request.

According to an embodiment of the present disclosure, upon receiving the location information or the supplemental location information from the peripheral electronic device 200, the control module 100 may determine a location of the electronic device 100 using the received location information or supplemental location information. For example, the control module 140 may determine the location information received from the peripheral electronic device 200 as the location of the main electronic device 100. For another example, the control module 140 may determine the location of the main electronic device 100 using the location information received from the peripheral electronic device 200 and location information obtained by the main electronic device 100 using another positioning means. For another example, the control module 140 may perform positioning using the supplemental location information received from the peripheral electronic device 200, and may determine location information obtained as a result of the positioning as the location of the main electronic device 100.

Figure 10:
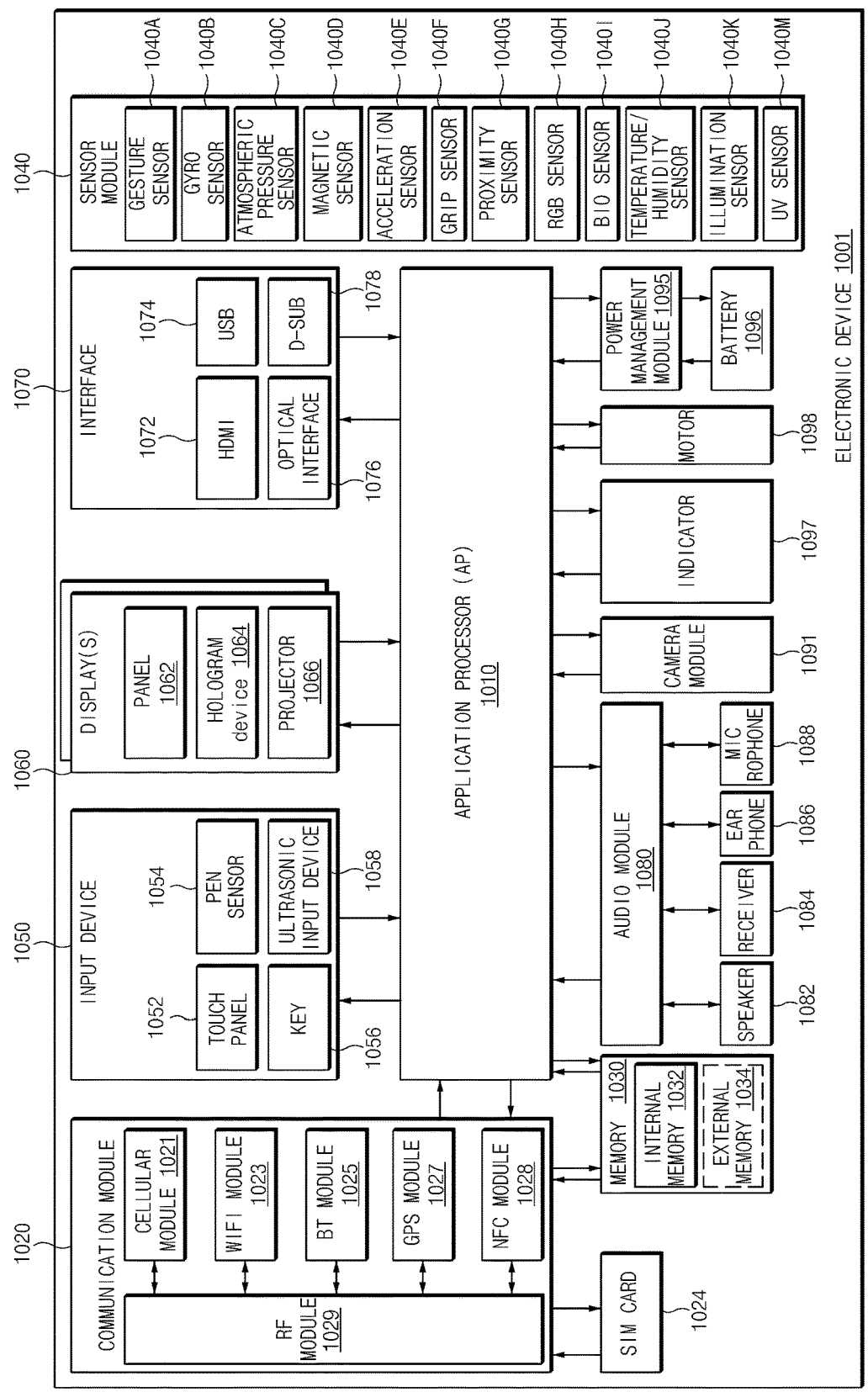
FIG. 10 is a block diagram of an example of an electronic device, according to various embodiments of the present disclosure.

FIG. 10 is a block diagram of an example of an electronic device, according to various embodiments of the present disclosure. An electronic device 1001 may constitute, for example, a part or the entirety of the electronic device 100 illustrated in FIG. 9. Referring to FIG. 10, the electronic device 1001 may include at least one application processor (AP) 1010, a communication module 1020, a subscriber identification module (SIM) card 1024, a memory 1030, a sensor module 1040, an input device 1050, a display 1060, an interface 1070, an audio module 1080, a camera module 1091, a power management module 1095, a battery 1096, an indicator 1097, and a motor 1098.

The AP 1010 may include any suitable type of processing circuitry, such as one or more general purpose processors (e.g., ARM-based processors), a Digital Signal Processor (DSP), a Programmable Logic Device (PLD), an Application-Specific Integrated Circuit (ASIC), a Field-Programmable Gate Array (FPGA), etc. The AP 1010 may run an operating system or an application program so as to control a plurality of hardware or software elements connected to the AP 1010, and may process various data including multimedia data and may perform an operation thereon. The AP 1010 may be implemented with, for example, a system on chip (SoC). According to an embodiment of the present disclosure, the AP 1010 may further include a graphic processing unit (GPU) (not shown).

The communication module 1020 (e.g., the communication module 110) may perform data transmission/reception for communication between the electronic device 1001 (e.g., the electronic device 100) and other electronic devices connected thereto through a network. According to an embodiment of the present disclosure, the communication module 1020 may include a cellular module 1021, a Wi-Fi module 1023, a BT module 1025, a GPS module 1027, an NFC module 1028, and a radio frequency (RF) module 1029.

The cellular module 1021 may provide a voice call service, a video call service, a text message service, or an Internet service through a telecommunications network (e.g., an LTE, LTE-A, CDMA, WCDMA, UMTS, WiBro or GSM network). Furthermore, the cellular module 1021 may identify and authenticate electronic devices in the telecommunications network using, for example, a subscriber identification module (e.g., the SIM card 1024). According to an embodiment of the present disclosure, the cellular module 1021 may perform at least a part of functions provided by the AP 1010. For example, the cellular module 1021 may perform at least a part of a multimedia control function.

According to an embodiment of the present disclosure, the cellular module 1021 may include a communication processor (CP). The cellular module 1021 may be implemented with, for example, a SoC. Although FIG. 10 illustrates that the cellular module 1021 (e.g., a communication processor), the memory 1030, and the power management module 1095 are separate from the AP 1010, the AP 1010 may include at least a part of the foregoing elements (e.g., the cellular module 1021), according to an embodiment of the present disclosure.

According to an embodiment of the present disclosure, the AP 1010 or the cellular module 1021 (e.g., a communication processor) may load, in a volatile memory, a command or data received from nonvolatile memories connected to the AP 1010 and the cellular module 1021 respectively or at least one of other elements, so as to process the command or data. Furthermore, the AP 1010 or the cellular module 1021 may store, in the nonvolatile memory, data received from or generated by at least one of the other elements.

Each of the Wi-Fi module 1023, the BT module 1025, the GPS module 1027, and the NFC module 1028 may include, for example, a processor for processing data transmitted/received through the modules. FIG. 10 illustrates that the cellular module 1021, the Wi-Fi module 1023, the BT module 1025, the GPS module 1027, and the NFC module 1028 are separate blocks. However, according to an embodiment of the present disclosure, at least a part (e.g., two or more) of the cellular module 1021, the Wi-Fi module 1023, the BT module 1025, the GPS module 1027, and the NFC module 1028 may be included in a single integrated chip (IC) or IC package. For example, at least a part (e.g., a communication processor corresponding to the cellular module 1021 and a Wi-Fi processor corresponding to the Wi-Fi module 1023) of the cellular module 1021, the Wi-Fi module 1023, the BT module 1025, the GPS module 1027, and the NFC module 1028 may be implemented with a single SoC.

The RF module 1029 may transmit/receive data, for example, may transmit/receive RF signals. Although not illustrated, for example, a transceiver, a power amp module (PAM), a frequency filter or a low noise amplifier (LNA) may be included in the RF module 1029. Furthermore, the RF module 1029 may further include a component such as a conductor or a wire for transmitting/receiving free-space electromagnetic waves in a wireless communication system. FIG. 10 illustrates that the cellular module 1021, the Wi-Fi module 1023, the BT module 1025, the GPS module 1027, and the NFC module 1028 share the single RF module 1029. However, according to an embodiment of the present disclosure, at least one of the cellular module 1021, the Wi-Fi module 1023, the BT module 1025, the GPS module 1027, or the NFC module 1028 may transmit/receive RF signals through an additional RF module.

The SIM card 1024 may include a subscriber identification module, and may be inserted into a slot formed at a specific portion of the electronic device. The SIM card 1024 may include unique identification information (e.g., an integrated circuit card identifier (ICCID)) or subscriber information (e.g., international mobile subscriber identity (IMSI)).

The memory 1030 (e.g., the memory 120) may include an internal memory 1032 or an external memory 1034. The internal memory 1032 may include at least one of a volatile memory (e.g., a dynamic RAM (DRAM), a static RAM (SRAM), a synchronous dynamic RAM (SDRAM), or the like) or a nonvolatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a NAND flash memory, a NOR flash memory, or the like).

According to an embodiment of the present disclosure, the internal memory 1032 may be a solid state drive (SSD). The external memory 1034 may include a flash drive, for example, compact flash (CF), secure digital (SD), micro secure digital (Micro-SD), mini secure digital (Mini-SD), extreme digital (xD), a memory stick, or the like. The external memory 1034 may be functionally connected to the electronic device 1001 through various interfaces. According to an embodiment of the present disclosure, the electronic device 1001 may further include a storage device (or a storage medium) such as a hard drive.

The sensor module 1040 may measure physical quantity or detect an operation state of the electronic device 1001 so as to convert measured or detected information into an electrical signal. The sensor module 1040 may include, for example, at least one of a gesture sensor 1040A, a gyro sensor 1040B, a barometric pressure sensor 1040C, a magnetic sensor 1040D, an acceleration sensor 1040E, a grip sensor 1040F, a proximity sensor 1040G, a color sensor 1040H (e.g., a red/green/blue (RGB) sensor), a biometric sensor 1040I, a temperature/humidity sensor 1040J, an illumination sensor 1040K, or an ultraviolet (UV) sensor 1040M. Additionally or alternatively, the sensor module 1040 may include, for example, (not shown) an olfactory sensor (E-nose sensor), an electromyography (EMG) sensor, an electroencephalogram (EEG) sensor, an electrocardiogram (ECG) sensor, an infrared (IR) sensor, an iris recognition sensor, a fingerprint sensor, or the like. The sensor module 1040 may further include a control circuit for controlling at least one sensor included therein.

The input device 1050 may include a touch panel 1052, a (digital) pen sensor 1054, a key 1056, or an ultrasonic input device 1058. The touch panel 1052 may recognize a touch input using at least one of capacitive, resistive, infrared and ultraviolet sensing methods. The touch panel 1052 may further include a control circuit. In the case of using the capacitive sensing method, a physical contact recognition or proximity recognition is allowed. The touch panel 1052 may further include a tactile layer. In this case, the touch panel 1052 may provide tactile feedback to a user.

The (digital) pen sensor 1054 may be implemented in a similar or same manner as that for receiving a touch input of a user, or may be implemented using an additional sheet for recognition. The key 1056 may include, for example, a physical button, an optical button, or a keypad. The ultrasonic input device 1058, which is an input device for generating an ultrasonic signal, may enable the electronic device 1001 to sense a sound wave through a microphone (e.g., a microphone 1088) so as to identify data, wherein the ultrasonic input device 1058 enables wireless recognition. According to an embodiment of the present disclosure, the electronic device 1001 may use the communication module 1020 so as to receive a user input from an external device (e.g., a computer or a server) connected to the communication module 1020.

The display 1060 may include a panel 1062, a hologram device 1064, or a projector 1066. The panel 1062 may be, for example, a liquid crystal display (LCD) or an active-matrix organic light-emitting diode (AM-OLED). The panel 1062 may be, for example, flexible, transparent or wearable. The panel 1062 and the touch panel 1052 may be integrated into a single module. The hologram device 1064 may display a stereoscopic image in a space using a light interference phenomenon. The projector 1066 may project light onto a screen so as to display an image. The screen may be disposed in the inside or the outside of the electronic device 1001. According to an embodiment of the present disclosure, the display 1060 may further include a control circuit for controlling the panel 1062, the hologram device 1064, or the projector 1066.

The interface 1070 may include, for example, a high-definition multimedia interface (HDMI) 1072, a universal serial bus (USB) 1074, an optical interface 1076, or a D-subminiature 1078. Additionally or alternatively, the interface 1070 may include, for example, a mobile high-definition link (MHL) interface, a secure digital (SD) card/multimedia card (MMC) interface, or an infrared data association (IrDA) interface.

The audio module 1080 may convert a sound into an electrical signal or vice versa. The audio module 1080 may process sound information input or output through a speaker 1082, a receiver 1084, an earphone 1086, or the microphone 1088.

According to an embodiment of the present disclosure, the camera module 1091 for shooting a still image or a video may include at least one image sensor (e.g., a front sensor or a rear sensor), a lens (not shown), an image signal processor (ISP) (not shown), or a flash (e.g., an LED or a xenon lamp) (not shown).

The power management module 1095 may manage the power supply of the electronic device 1001. Although not illustrated, a power management integrated circuit (PMIC), a charger integrated circuit (IC), or a battery or fuel gauge may be included in the power management module 1095.

The PMIC may be mounted on an integrated circuit or an SoC semiconductor. A charging method may be classified into a wired charging method and a wireless charging method. The charger IC may charge a battery, and may prevent an overvoltage or an overcurrent from being introduced from a charger. According to an embodiment of the present disclosure, the charger IC may include a charger IC for at least one of the wired charging method or the wireless charging method. The wireless charging method may include, for example, a magnetic resonance method, a magnetic induction method, an electromagnetic method, or the like, and may include an additional circuit, for example, a coil loop, a resonant circuit, a rectifier, or the like.

The battery gauge may measure, for example, a remaining capacity of the battery 1096 and a voltage, current or temperature thereof while the battery is charged. The battery 1096 may store or generate electricity, and may supply power to the electronic device 1001 using the stored or generated electricity. The battery 1096 may include, for example, a rechargeable battery or a solar battery.

The indicator 1097 may indicate a specific state of the electronic device 1001 or a part thereof (e.g., the AP 1010), such as a booting state, a message state, a charging state, or the like. The motor 1098 may convert an electrical signal into a mechanical vibration. Although not illustrated, a processing device (e.g., a GPU) for supporting a mobile TV may be included in the electronic device 1001. The processing device for supporting a mobile TV may process media data according to the standards of digital multimedia broadcasting (DMB), digital video broadcasting (DVB), Media-FLO™, or the like.

Each of the above-mentioned elements of the electronic device according to various embodiments of the present disclosure may be configured with one or more components, and the names of the elements may be changed according to the type of the electronic device. The electronic device according to various embodiments of the present disclosure may include at least one of the above-mentioned elements, and some elements may be omitted or other additional elements may be added. Furthermore, some of the elements of the electronic device according to various embodiments of the present disclosure may be combined with each other so as to form one entity, so that the functions of the elements may be performed in the same manner as before the combination.

Figure 11:
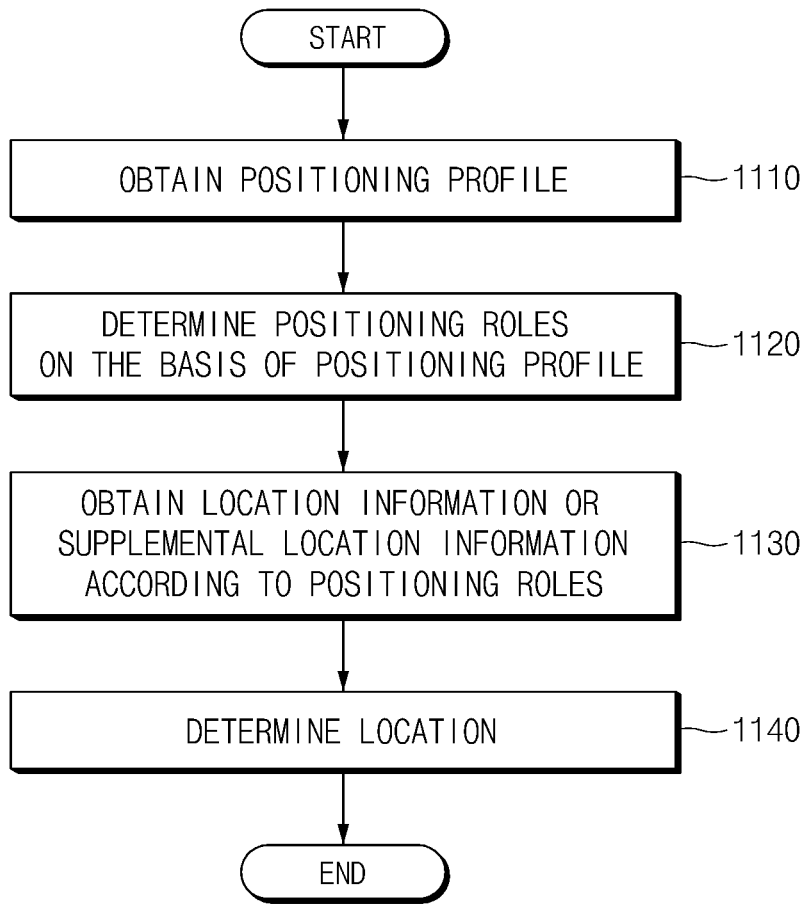
FIG. 11 is a flowchart of an example of a process, according to various embodiments of the present disclosure.

FIG. 11 is a flowchart of an example of a process, according to various embodiments of the present disclosure.

The flowchart illustrated in FIG. 11 may include operations that are performed in the main electronic device 100 illustrated in FIG. 9. Therefore, the above descriptions of the main electronic device 100 illustrated in FIG. 9 may be applied to the flowchart illustrated in FIG. 11 even though the descriptions are omitted below.

Referring to FIG. 11, in operation 1110, the main electronic device 100 may obtain the positioning profile from the main electronic device 100 or the peripheral electronic device 200. According to an embodiment of the present disclosure, the main electronic device 100 may generate the positioning profile. According to an embodiment of the present disclosure, the main electronic device 100 may receive the positioning profile from the peripheral electronic device 200. Operation 1110 will be described in more detail with reference to FIG. 12.

In operation 1120, if a positioning event occurs, the main electronic device 100 may determine positioning roles of the main electronic device 100 and the peripheral electronic device 200. According to an embodiment of the present disclosure, the main electronic device 100 may determine positioning roles according to a positioning purpose. According to an embodiment of the present disclosure, the main electronic device 100 may determine positioning roles so that power consumption of the main electronic device 100 or the peripheral electronic device 200 is minimized. According to an embodiment of the present disclosure, the main electronic device 100 may determine positioning roles so that the potential for error in any location measurements that are taken is minimized. According to an embodiment of the present disclosure, the main electronic device 100 may determine positioning roles so that a time required for positioning is minimized.

According to an embodiment of the present disclosure, the main electronic device 100 may determine positioning roles without the positioning profile of the peripheral electronic device 200. For example, in the case where the positioning event occurs, but the main electronic device 100 does not have a currently available positioning means, the main electronic device 100 may determine that the main electronic device 100 should not perform positioning and another peripheral electronic device 200 should perform the positioning. For another example, it may be determined that the main electronic device 100 should perform positioning, and another peripheral electronic device 200 should provide supplemental location information to the main electronic device 100.

According to an embodiment of the present disclosure, when determining positioning roles, the main electronic device 100 may check whether the positioning profile is valid. For example, if a specified time or a longer time has elapsed since the last update of the positioning profile, it may be determined that the positioning profile is not valid. If it is determined that the positioning profile is not valid, the main electronic device 100 may update the positioning profile of the main electronic device 100 or the peripheral electronic device 200. Alternatively, if it is determined that the positioning profile is not valid, the main electronic device 100 may request of the peripheral electronic device 200 to provide an indication of one or more positioning means that are currently available in the peripheral electronic device 200.

In operation 1130, the main electronic device 100 may obtain location information or supplemental location information from the peripheral electronic device 200. According to an embodiment of the present disclosure, the main electronic device 100 may transmit, to the peripheral electronic device 200, a control signal corresponding to a determined positioning role, so as to obtain the location information or the supplemental location information from the peripheral electronic device 200.

For example, if it is determined that the main electronic device 100 should perform positioning, and the peripheral electronic device 200 should provide supplemental location information required for the positioning performance of the main electronic device 100, the main electronic device 100 may request and receive the supplemental location information from the peripheral electronic device 200.

For another example, if it is determined that the peripheral electronic device 200 should perform positioning, and the main electronic device 100 should provide supplemental location information required for the positioning performance of the peripheral electronic device 200, the control module 140 may provide the supplemental location information to the peripheral electronic device 200. For example, if it is determined that the peripheral electronic device 200 should perform GPS positioning, the main electronic device 100 may transmit A-GPS information or the last position that is known to the peripheral electronic device 200. For another example, if it is determined that the peripheral electronic device 200 should perform WPS positioning, the main electronic device 100 may transmit tile information, a last known position, or cache information to the peripheral electronic device 200. For another example, if it is determined that the peripheral electronic device 200 should perform PDR positioning, the main electronic device 100 may transmit tile information, a last known position, or cache information to the peripheral electronic device 200. For another example, if it is determined that the peripheral electronic device 200 should perform geo-fence monitoring, the main electronic device 100 may transmit, to the peripheral electronic device 200, geo-fence-related information (e.g., a central point defined by latitude and longitude, a radius from the central point, or a network identifier (e.g., a cell ID, a Wi-Fi ID, Wi-Fi AP information, beacon information, Bluetooth MAC address, or the like)).

According to an embodiment of the present disclosure, if it is determined that the peripheral electronic device 200 should perform geo-fence monitoring, the main electronic device 100 may receive, from the peripheral electronic device 200, a result of geo-fence monitoring (e.g., whether or not geo-fence entry/exit occurs).

In operation 1140, upon receiving the location information or the supplemental location information from the peripheral electronic device 200, the main electronic device 100 may determine a location of the electronic device 100 using the received location information or supplemental location information. For example, the main electronic device 100 may determine the location information received from the peripheral electronic device 200 as the location of the main electronic device 100. For another example, the main electronic device 100 may determine the location of the main electronic device 100 using the location information received from the peripheral electronic device 200 and location information obtained by the main electronic device 100 using another positioning means. For another example, the main electronic device 100 may perform positioning using the supplemental location information received from the peripheral electronic device 200, and may determine location information obtained as a result of the positioning as the location of the main electronic device 100.

According to an embodiment of the present disclosure, the main electronic device 100 may enter a sleep mode after requesting positioning so that power consumption may be reduced.

Figure 12:
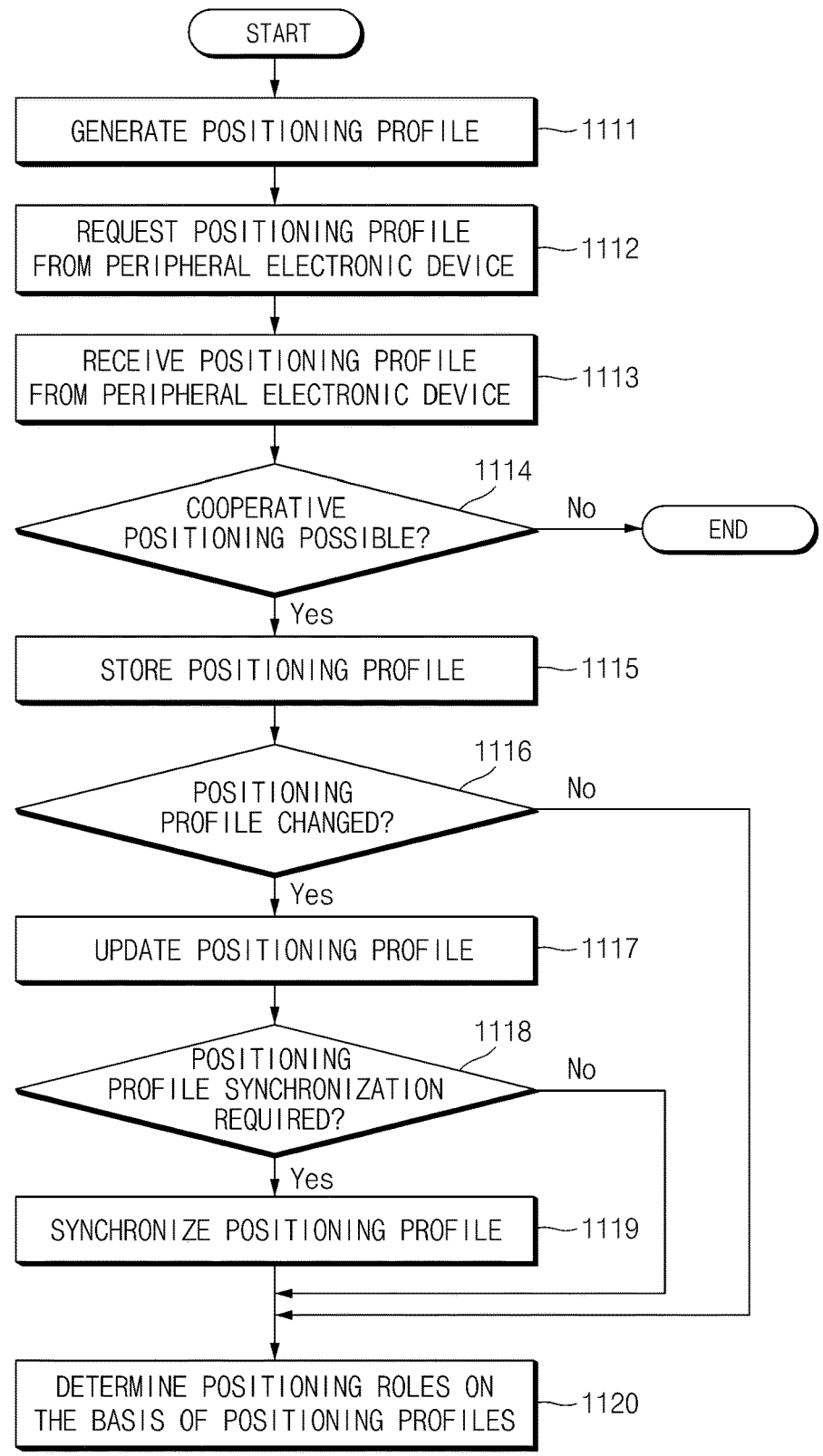
FIG. 12 is a flowchart of an example of a process for obtaining a positioning profile, according to various embodiments of the present disclosure.

FIG. 12 is a flowchart of an example of a process for obtaining a positioning profile as discussed with respect to operation 1110 of FIG. 11, according to various embodiments of the present disclosure. In operation 1111, the main electronic device 100 may generate a positioning profile. According to an embodiment of the present disclosure, the positioning profile may include at least one of positioning means information of the electronic device 100 or 200, location information measured currently or previously by a positioning means, supplemental location information for each positioning means, current positioning means information of the electronic device, priority information of a positioning means, data synchronization information of the electronic device, data type of location information or supplemental location information, or state information of the electronic device.

In operation 1112, the main electronic device 100 may request the positioning profile from the peripheral electronic device 200. In operation 1113, the main electronic device 100 may receive the positioning profile from the peripheral electronic device 200.

In operation 1114, upon receiving the positioning profile of the peripheral electronic device 200 therefrom, the main electronic device 100 may determine whether cooperative positioning is possible on the basis of the positioning profiles of the main electronic device 100 and the peripheral electronic device 200.

If the main electronic device 100 determines that cooperative positioning is not possible in operation 1114, the process may end. The the main electronic device may determine that cooperative positioning is not possible, for example, when a remaining capacity of a battery of the peripheral electronic devices 200 is less than a threshold value, when available positioning means of the peripheral electronic devices 200 is not exist, or when the peripheral electronic devices 200 is set not to perform cooperative positioning by a user. That is, if it is determined that cooperative positioning is not possible in operation 1114, typical positioning may be performed using a single electronic device.

If it is determined that cooperative positioning is possible in operation 1114, the main electronic device 100 may store the positioning profile in operation 1115. According to an embodiment of the present disclosure, if it is determined that only some of the peripheral electronic devices 200 are available for cooperative positioning, the main electronic device 100 may store the positioning profiles of only those peripheral electronic devices that are available for cooperative positioning in operation 1115.

In operation 1116, the main electronic device 100 may determine whether the positioning profile has changed. If it is determined that the positioning profile has not been changed, the main electronic device 100 may perform operation 1120 of FIG. 11. If it is determined that the positioning profiles has been changed, the main electronic device 100 may update the positioning profile in operation 1117.

If operation 1117 for updating the positioning profile is performed, the main electronic device 100 may determine whether synchronization of the updated positioning profile is required in operation 1118. For example, in the case where a change of the positioning profile may affect cooperative positioning, it may be determined that synchronization of the positioning profile is required.

If it is determined that synchronization of the positioning profile is not required in operation 1118, the main electronic device 100 may perform operation 1120 of FIG. 11. If it is determined that synchronization of the positioning profile is required in operation 1118, the main electronic device 100 transmits the updated positioning profile to the peripheral electronic device 200 to synchronize the positioning profile in operation 1119.

Figure 13:
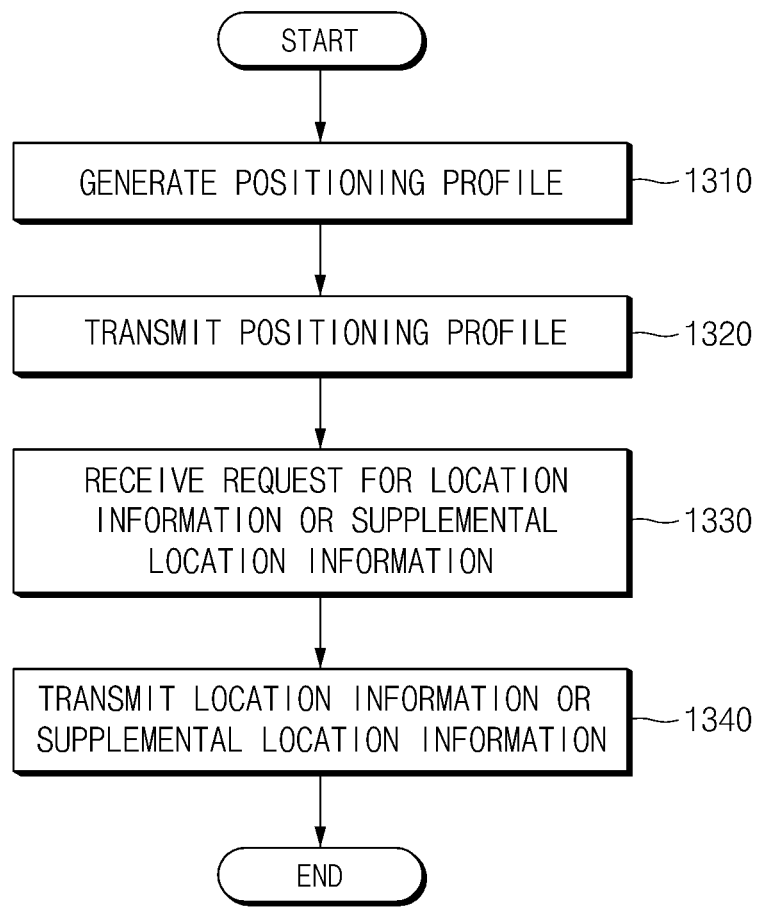
FIG. 13 is a flowchart of an example of a process, according to various embodiments of the present disclosure.

FIG. 13 is a flowchart of an example of a process, according to various embodiments of the present disclosure.

In operation 1310, the peripheral electronic device 200 may generate the positioning profile.

In operation 1320, the peripheral electronic device 200 may transmit the positioning profile to the main electronic device 100. According to an embodiment of the present disclosure, the peripheral electronic device 200 may transmit the positioning profile to the main electronic device 100 upon request. According to an embodiment of the present disclosure, the peripheral electronic device 200 may transmit the positioning profile to the main electronic device 100 according to a specified period. According to an embodiment of the present disclosure, the peripheral electronic device 200 may transmit the positioning profile to the main electronic device 100 if the positioning profile is updated. For example, if the positioning profile is changed, the peripheral electronic device 200 may update the positioning profile. If the positioning profile is updated, the main electronic device 100 may determine whether synchronization of the updated positioning profile is required. For example, in the case where a change of the positioning profile may affect cooperative positioning, it may be determined that synchronization of the positioning profile is required. If it is determined that synchronization of the positioning profile is required, the main electronic device 100 may transmit the updated positioning profile to the peripheral electronic device 200 so as to synchronize the positioning profile.

In operation 1330, the peripheral electronic device 200 may receive, from the main electronic device 100, a request for location information or supplemental location information. In operation 1340, the peripheral electronic device 200 may transmit the location information or the supplemental location information to the main electronic device 100.

According to an embodiment of the present disclosure, if the location information of the peripheral electronic device 200 is requested by the main electronic device 100, the peripheral electronic device 200 may obtain the location information using an available positioning means, and may transmit the location information to the main electronic device 100. According to an embodiment of the present disclosure, the peripheral electronic device 200 may use the obtained location information for itself. For example, in the case where navigation applications are running in the main electronic device 100 and the peripheral electronic device 200 at the same time, the peripheral electronic device 200 may obtain the location information and may transmit the location information to the main electronic device 100, and may also use the obtained location information in the navigation application running in the peripheral electronic device 200.

According to an embodiment of the present disclosure, if a positioning method is specified in the location information request of the main electronic device 100, positioning may be performed using the specified positioning method. According to an embodiment of the present disclosure, if supplemental location information related to the specified positioning method is received together with the location information request, the received supplemental location information may be used for positioning. According to an embodiment of the present disclosure, the peripheral electronic device 200 may perform positioning using a positioning method other than the specified positioning method depending on situations.

According to an embodiment of the present disclosure, if the location information request is received without a specified positioning method, positioning may be performed using at least one of available positioning means.

According to an embodiment of the present disclosure, the peripheral electronic device 200 may transmit the obtained location information to the main electronic device 100 only once. According to an embodiment of the present disclosure, the peripheral electronic device 200 may periodically perform positioning in response to a request of the main electronic device 100, and may transmit the obtained location information periodically.

Figure 14:
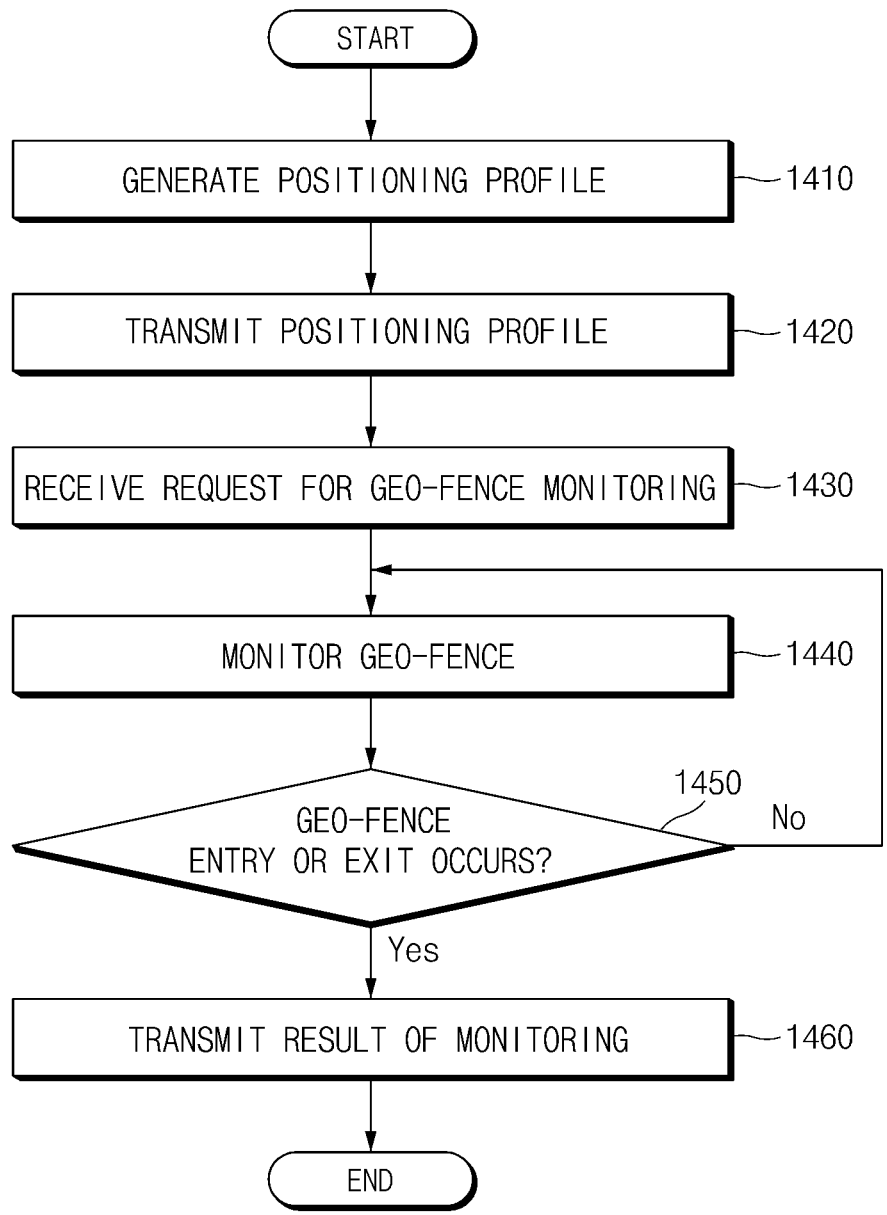
FIG. 14 is a flowchart of an example of a process for geo-fence monitoring, according to various embodiments of the present disclosure.

FIG. 14 is a flowchart of an example of a process for geo-fence monitoring, according to various embodiments of the present disclosure.

Referring to FIG. 14, in operation 1410, the peripheral electronic device 200 may generate the positioning profile.

In operation 1420, the peripheral electronic device 200 may transmit the positioning profile to the main electronic device 100. According to an embodiment of the present disclosure, the peripheral electronic device 200 may transmit the positioning profile to the main electronic device 100 upon request. According to an embodiment of the present disclosure, the peripheral electronic device 200 may transmit the positioning profile to the main electronic device 100 according to a specified period. According to an embodiment of the present disclosure, the peripheral electronic device 200 may transmit the positioning profile to the main electronic device 100 if the positioning profile is updated. For example, if the positioning profile is changed, the peripheral electronic device 200 may update the positioning profile. If the positioning profile is updated, the main electronic device 100 may determine whether synchronization of the updated positioning profile is required. For example, in the case where a change of the positioning profile may affect cooperative positioning, it may be determined that synchronization of the positioning profile is required. If it is determined that synchronization of the positioning profile is required, the main electronic device 100 may transmit the updated positioning profile to the peripheral electronic device 200 so as to synchronize the positioning profile.

In operation 1430, the peripheral electronic device 200 may receive a geo-fence monitoring request from the main electronic device 100. According to an embodiment of the present disclosure, the peripheral electronic device 200 may receive geo-fence-related information (e.g., a central point defined by latitude and longitude, a radius from the central point, or a network identifier (e.g., a cell ID, a Wi-Fi ID, Wi-Fi AP information, beacon information, Bluetooth MAC address, or the like)) together with the geo-fence monitoring request.

In operation 1440, the peripheral electronic device 200 may perform geo-fence monitoring using the received geo-fence-related information. In operation 1450, the peripheral electronic device 200 may determine whether geo-fence entry/exit occurs. If geo-fence entry/exit is not detected through the geo-fence monitoring, the peripheral electronic device 200 may return to operation 1440 to perform the geo-fence monitoring. If geo-fence entry/exit is detected through the geo-fence monitoring, the peripheral electronic device 200 may proceed to operation 1460 to transmit a monitoring result to the main electronic device 100.

Described below are specific examples to which various embodiments of the present disclosure are applicable.

<Geo-Fence Monitoring Using a Plurality of Electronic Devices>

There may exist a geo-fence #1 defined as a Bluetooth MAC address, a geo-fence #2 defined as Wi-Fi AP information, a geo-fence #3 defined as GPS coordinates, and a geo-fence #4 defined as a beacon ID. Here, defining a geo-fence as a Bluetooth MAC address represents that an electronic device detects that it enters a corresponding geo-fence once the electronic devices discovers the Bluetooth MAC address.

Depending on situations, the main electronic device 100 may request the peripheral electronic device 200 to perform geo-fence monitoring. According to an embodiment of the present disclosure, the main electronic device 100 may request a first peripheral electronic device to perform geo-fence monitoring on the geo-fence #1, while providing geo-fence #1 information defined as a Bluetooth MAC address to the first peripheral electronic device. Furthermore, the main electronic device 100 may request a second peripheral electronic device to perform geo-fence monitoring on the geo-fence #2, while providing geo-fence #2 information defined as Wi-Fi AP information to the second peripheral electronic device. Moreover, the main electronic device 100 may request a third peripheral electronic device to perform geo-fence monitoring on the geo-fence #3, while providing geo-fence #3 information defined as latitude/longitude-based GPS coordinates to the third peripheral electronic device. In addition, the main electronic device 100 may request a fourth peripheral electronic device to perform geo-fence monitoring on the geo-fence #4, while providing geo-fence #4 information defined as a beacon ID to the fourth peripheral electronic device. After requesting a peripheral electronic device to perform geo-fence monitoring, the main electronic device 100 may enter a sleep mode or may suspend geo-fence monitoring of the main electronic device 100. The peripheral electronic device 200 may perform geo-fence monitoring using received geo-fence data, and may transmit a monitoring result to the main electronic device 100 if geo-fence entry or exit is detected.

According to another embodiment of the present disclosure, the main electronic device 100 may request the peripheral electronic device 200 to perform geo-fence monitoring, and may monitor a geo-fence that is different from a geo-fence that the peripheral electronic device 200 is requested to monitor. For example, if there exist the geo-fence #3 defined as GPS coordinates and the geo-fence #2 defined as Wi-Fi AP information, the main electronic device 100 may monitor the geo-fence #3, and may request the peripheral electronic device 200 to monitor the geo-fence #2.

According to another embodiment of the present disclosure, the main electronic device 100 may request the peripheral electronic device 200 to monitor a geo-fence that is the same as a geo-fence that the main electronic device 100 monitors, and may change a monitoring period. For example, the main electronic device 100 may perform geo-fence monitoring at a period of about 10 seconds, and then may perform geo-fence monitoring at a period of about 20 seconds after transmitting a geo-fence monitoring request to a peripheral terminal. According to an embodiment of the present disclosure, the main electronic device 100 may request the peripheral electronic device 200 to perform geo-fence monitoring according to different monitoring periods.

<Change of a Positioning Operation Using an Inner/Outer Network>

According to an embodiment of the present disclosure, a positioning operation may be dynamically changed on the basis of positioning profile synchronization between an inner network and an outer network. Information indicating that a connection to a vehicle is established through the outer network may be obtained, and information indicating that GPS positioning is enabled in the vehicle may be obtained. A terminal that has obtained such outer network information may dynamically change a positioning method of the terminal on the basis of the information. For example, the terminal may perform GPS positioning before being connected to the vehicle, but, if information on the outer network (in this case, a GPS-positioning-enabled vehicle is included in the outer network) is synchronized, the terminal may suspend the GPS positioning or may change a period of the GPS positioning. Alternatively, the positioning method may be changed from the GPS positioning to another positioning method. For example, since the GSP positioning requires high power consumption, the positioning method may be changed to cell-based positioning that requires less power than that of the GPS positioning. As described above, the reliability of a positioning value may be improved using a GPS positioning value received from a vehicle and a positioning value obtained by a user's terminal.

Furthermore, in the case where the terminal comes indoors, the outer network may support ultrasonic positioning. In this case, at the moment when the terminal determines that it comes indoors, the terminal may activate a specified positioning module (in this case, a speaker module for ultrasonic positioning) so as to check a positioning method available in the outer network. Alternatively, at the moment when the terminal determines that it comes indoors, the terminal may receive the positioning profile from the outer network. Alternatively, the terminal may periodically request an external positioning profile to receive the external positioning profile from the outer network. The terminal that has received information indicating that ultrasonic positioning is enabled in the outer network may activate a speaker module and may perform ultrasonic positioning. In this case, the terminal may suspend positioning performed according to a previous positioning method. Alternatively, the terminal may change a period of the positioning performed according to the previous positioning method.

Furthermore, a positioning result of the terminal or information obtained through operation of the terminal may be transmitted to the outer network so that a value corresponding to the result or information may be used in the outer network. For example, the terminal performs positioning using the outer network and a WPS. In this case, the terminal may transmit scanned information of Wi-Fi to the outer network so that a WPS-related database, among the positioning profiles of the outer network, may be updated. At this moment, if Bluetooth currently operates, Bluetooth-scanned information may also be obtained by the terminal. The information obtained in this manner may be transmitted to the outer network through Wi-Fi. The outer network that has received this information may update a Bluetooth-related database using the information.

<Monitoring a Geo-Fence of a Terminal by a Vehicle>

According to an embodiment of the present disclosure, a user in a vehicle may associate a smartphone of the user with the vehicle. The smartphone associated with the vehicle recognizes that a positioning device including a GPS module exists in the vehicle, and transmits geo-fence information set in the smartphone to a navigation system of the vehicle. Since the navigation system is installed in the vehicle, a location of the vehicle may be detected in real time using a satellite navigation system such as the GPS while the vehicle is driven. Therefore, the geo-fence monitoring may be performed by the vehicle's systems while the vehicle is driven. Moreover, while the geo-fence monitoring is performed by the vehicle, the smartphone enters a sleep mode to suspend performance of geo-fence monitoring, or reduces the frequency of monitoring operation to decrease the number of times of wake up, thereby reducing battery power consumption. Geo-fence monitoring is performed until a connection to the vehicle is released, and the occurrence of geo-fence entry is notified to the smartphone.

<Interworking with an Inner Network of Another User>

According to an embodiment of the present disclosure, cooperative positioning may be performed between an inner network including an electronic device of one person and an inner network including an electronic device of another person.

A user A performs cooperative positioning using a smartphone and a smartwatch, and a user B performs cooperative positioning using a smartphone and smart glasses. The user A performs GPS positioning using the smartphone, and performs WPS positioning using the smartwatch. The user B performs WPS positioning using the smartphone, and performs VLC positioning using the smart glasses.

When the users A and B approach each other within a distance that enables communication between a device that is carried by the user A and the user B, the users A and B may form a group together. If the group is formed, the positioning profile of the inner network of the user A is shared with the positioning profile of the inner network of the user B, and an integrated positioning profile is generated, so that the users A and B may form a massive inner network together. The electronic devices of both the users A and B are functionally connected to the massive inner network. Therefore, on the basis of the integrated positioning profile, the smartphone of the user A may perform GPS positioning, the smartphone of the user B may perform Wi-Fi scanning, and the smart glasses of the user B may perform VLC positioning. Since a Wi-Fi scanning operation of the smartwatch of the user A overlaps with that of the smart phone of the user B, the operation of the smartwatch of the user A may be suspended. The process of generating the integrated positioning profile may be determined by a master electronic device, and, if there exists a common communication protocol related to cooperative positioning, a role of each electronic device may be determined on the basis of the common communication protocol.

<Interworking with an Electronic Device of Another User>

According an embodiment of the present disclosure, an electronic device of a person may be associated with a network including electronic devices of another person.

A user A carries a smartphone and wears a smart band, and these electronic devices form an inner network. Here, when a smartphone of a user B approaches the inner network of the user A, the user A may add the smartphone of the user B to the inner network of the user A.

The user B transmits A-GPS information that has been used in positioning by the smartphone of the user B to the smartphone of the user A on the network, and the smartphone of the user A may perform GPS positioning. Location information determined by the smartphone of the user A may be transferred to the smartphone of the user B on the inner network.

In the case where the smart band of the user A receives a BLE signal transmitted from a coffee shop, the smartphone of the user A and the smartphone of the user B may simultaneously receive coffee shop information received by the smart band of the user A.

<Positioning Module Change According to a State of an Electronic Device and Data Transmission for Obtaining Location Information>

According to an embodiment of the present disclosure, a request for location information may be sent to the peripheral electronic device 200 according to a battery level state. While a terminal is associated with a smartwatch, if a battery level of the terminal decreases to a reference value or less, or if a remaining battery capacity of the smartwatch is higher than that of the terminal, the terminal may request the smartwatch to perform positioning. Here, the positioning request may be intended to simply make a request for positioning. Alternatively, a positioning method that is currently available in the smartwatch may be specified on the basis of the positioning profile such as GPS, WPS, PDR, or the like so as to accompany the positioning request, or a positioning method may be specified according to the type of an application used in the terminal so as to accompany the positioning request. For example, in the case where the terminal runs an application that requires accurate location information, an accurate positioning method such as a GPS-based method may be specified to make the positioning request. For another example, in the case where the terminal runs an application that requires low power consumption and relatively less accurate location information such as geo-fence monitoring, a positioning method such as cell-based positioning may be specified to make the positioning request. Furthermore, the terminal may specify a positioning method different from a positioning method currently used in the terminal, so as to transmit the positioning request to the smartwatch.

If the terminal has valid supplemental location information, this information may be transmitted to the smartwatch together with the positioning request. For example, if the terminal has tile information for WPS positioning, the terminal may transmit the tile information to the smartwatch together with the positioning request. The smartwatch that has received the positioning request may request supplemental location information required for positioning from the terminal. If the supplemental location information required for positioning and possessed by the terminal is not valid, the smartwatch may receive valid data for positioning via a wireless network of the smartwatch.

The smartwatch that has completed positioning may continue to perform positioning, or may terminate a positioning operation. A positioning operation of the smartwatch may vary with the type of an application that requires location information. For example, in the case where a navigation application requires positioning, the smartwatch may continuously perform positioning. In the case where an application that requires location information only once or only for a certain period of time requests positioning, the smartwatch may perform positioning only one or only for a certain period of time.

The smartwatch that has completed positioning may use obtained location information in the smartwatch. The smartwatch that has completed positioning may transmit the obtained location information to the terminal. Here, the location information may be transmitted to the terminal only once. Alternatively, the location information may be transmitted to the terminal periodically or aperiodically. Alternatively, the location information may be transmitted to the terminal when the terminal requests the location information. Alternatively, the location information may be transmitted to the terminal at a preset time.

The terminal that has requested the smartwatch to perform positioning may enter a sleep mode. The terminal that has requested the smartwatch to perform positioning may change a positioning method. For example, the terminal that has been performing positioning on the basis of the WPS may send a request for WPS positioning to the smartwatch, and then may perform positioning on the basis of the GPS. The terminal that has received the location information from the smartwatch may suspend positioning and may enter a sleep mode. The terminal that has received the location information from the smartwatch may enter a sleep mode while continuing to perform positioning. The terminal that has received the location information from the smartwatch may change a period of positioning.

Although the smartwatch alone has been mentioned with respect to the above example, a plurality of electronic devices may be applied instead of the smartwatch. The plurality of electronic devices may be electronic devices associated with the terminal or other peripheral electronic devices not associated with the terminal. The electronic device may be a vehicle, a home appliance, or a machine-to-machine (M2M)-enabled electronic device.

<Change of a Positioning Entity According to Change of a Positioning Means>

According to an embodiment of the present disclosure, in the case where a module for positioning is turned off in a terminal, a request for location information may be sent to the peripheral electronic device 200. For example, in the case where a Wi-Fi module of the terminal is turned off, the terminal may not turn on the Wi-Fi module to perform WPS positioning, but instead the smartwatch that has received the positioning request may perform WPS positioning using a Wi-Fi module.

Furthermore, in the case where a module for positioning is in use, a positioning entity may be changed. For example, in the case where the terminal downloads large-scale data at high speed through Wi-Fi, a positioning request may be transmitted to the smartwatch. In the case where the terminal downloads large-scale data at high speed through Wi-Fi, the terminal may perform positioning using a module other than a Wi-Fi module.

Furthermore, in the case where the terminal uses a large amount of CPU resources, a positioning entity may be changed. For example, if it is determined that the terminal uses a large amount of processing resources to simultaneously perform video/voice calling and game or video playback, a positioning request may be sent to the smartwatch.

Furthermore, if an active module exists in the smartwatch, the terminal may send a positioning request to the smartwatch so that the smartwatch may perform positioning using the module. For example, if it is determined that a Bluetooth module is turned on in the smartwatch on the basis of the positioning profile or by exchanging capacity information, the terminal may send, to the smartwatch, a positioning request in which a positioning method based on a Bluetooth module is specified.

<Change of a Positioning Entity at the Time of Entry to a Specific Region>

According to an embodiment of the present disclosure, a terminal may request location information when entering a specific region or a geo-fence. If the terminal obtains, from an outer network, information indicating that VLC positioning is enabled in a specific region when entering the specific region, the terminal may change a positioning entity into the peripheral electronic device 200 capable of VLC positioning. Since VLC positioning is unable to be performed if the terminal is located in a pocket of a user or in a bag, a positioning request may be transmitted through smart glasses that are able to sense light constantly.

In the case where the terminal enters a store in which a Bluetooth tag for transmitting/receiving beacons complying with a Bluetooth 4.0 standard is installed while performing positioning using WPS and PDR indoors, the terminal may suspend an existing positioning system and may transmit, to the smartwatch, a request for switching to a positioning mode based on a beacon. A smartwatch that has received this request may receive a beacon signal through a Bluetooth module so as to detect entry to or exit from the store. Similarly, if it is determined that the user escapes from the store on the basis of the beacon signal, the smartwatch may transmit, to the terminal, a request for positioning based on WPS and PDR.

Furthermore, in the case where the terminal is required to perform earth's magnetic field positioning using a geomagnetic sensor, a positioning entity may be changed to the smartwatch. If the terminal is located in a bag, the terminal may undergo magnetic interference due to an object such as a credit card or the like contained in the bag, and thus may be unable to perform positioning accurately. In such a case, a positioning request may be transmitted to the smartwatch that is more suitable for performing positioning than the terminal. Alternatively, in the case where the terminal determines that magnetic field positioning is not accurate, the terminal may switch the positioning method to another positioning method so as to perform positioning. Alternatively, the terminal may switch the positioning method to a positioning method other than the magnetic field positioning so as to transmit the positioning request to the smartwatch.

Furthermore, in the case where PDR positioning is more accurate in the smartwatch than in the terminal, the positioning request may be transmitted to the smartwatch. For example, if the terminal is located in a pocket or a bag, the accuracy of PDR positioning may degrade. In this case, the terminal may send a request for PDR positioning to the smartwatch.

Furthermore, in the case where the smartwatch receives tag information of RFID such as NFC, the terminal may transmit the positioning request to the smartwatch. Since an RFID tag may provide an accurate location within a short range, corresponding location information may be obtained through the smartwatch. Alternatively, the RFID tag information obtained through the smartwatch may be transmitted to the terminal, so that the terminal may obtain the location information using the RFID tag information.

<Request for Positioning of a Peripheral Electronic Device According to a User Mode>

According to an embodiment of the present disclosure, a request for location information may be sent to the peripheral electronic device 200 according to a function performance operation of a user. For example, if a module such as a GPS module, a Wi-Fi module, or a Bluetooth module exists in an AP when a terminal enters a sleep state, the terminal may be required to wake up the AP for positioning. In this case, a request for location information may be sent to a smartwatch using sleep mode entrance of the terminal as a triggering point. The smartwatch that has received the location information may perform positioning using GPS, Bluetooth, PDR, or the like. The smartwatch that has obtained the location information may transmit the location information to the terminal.

In the case where PDR positioning is performed while the terminal is operated in a sleep mode, a PDR positioning value may be compensated periodically. However, in order to compensate the PDR positioning value, the terminal wakes up the AP to perform positioning. In this case, the terminal may be unable to remain in a sleep mode, causing high battery power consumption. Therefore, the request for the location information may be sent to the smartwatch in order to compensate the PDR positioning value while the terminal performs PDR positioning. The smartwatch that has received the positioning request may perform a positioning operation using an available positioning method, and may transmit obtained location information to the terminal. The terminal may compensate the PDR compensation value using the location information.

<Positioning Profile Setting According to Context>

According to an embodiment of the present disclosure, the positioning profile may be continuously switched according to a moving speed of a terminal or an inner network.

For example, a user may define a vehicle, cycle, or pedestrian state through a sensor of an electronic device. In the case of a vehicle having a relatively high speed, functions of GPS positioning, cell positioning, and Wi-Fi positioning which are generally used outdoors and enable positioning over a wide area may be set in the positioning profile. In the case of a cycle, GPS positioning, Wi-Fi positioning, and a BLE beacon service may be set in the positioning profile in consideration of an outdoor feature and a feature of moving around buildings. In the case of a pedestrian state, Wi-Fi positioning, fingerprint collection, BLE beacon, and proximity positioning may be set in the positioning profile in consideration of a feature of not differentiating an indoor place and an outdoor place, a relatively low speed, and a degree of freedom of movement.

<Sharing Geo-Fence Information in Emergency>

According to an embodiment of the present disclosure, geo-fence information may be shared when an emergency situation occurs.

For example, when an emergency situation occurs, a first user may set a region where the first user is located as a geo-fence, and may consistently notify a current emergency situation of the first user to the periphery thereof through BLE. When a second user enters the geo-fence set by the first user on the second user's way to its destination, a least one device of the second user may receive a BLE signal of the first user, and the second user may be guided to the first user on the basis of the BLE signal.

The first user may set its electronic devices such that, if a remaining battery capacity of a first electronic device that transmits the BLE signal becomes insufficient, the BLE signal is transmitted by a second electronic device capable of transmitting the BLE signal. An inner network of the first user may be scheduled so that an emergency signal is generated for a long time in consideration of a mutual current consumption state and availability of signal generation.

<Positioning Control According to a Traffic Situation>

According to an embodiment of the present disclosure, positioning may be controlled according to a traffic situation.

While a vehicle is driven, traffic state information may be received via a public network so that it may be determined that the vehicle is currently located in a traffic congestion section, or, it may be determined that the vehicle undergoes traffic congestion on the basis of internal vehicle information obtained through, for example, a vehicle meter. If the vehicle undergoes traffic congestion, a positioning operation of an electronic device connected within the vehicle may be disabled (e.g., GPS off, Wi-Fi scanning stop).

If the vehicle moves again or the traffic congestion is mitigated, an odometer or the like may recognize the movement of the vehicle and may share a vehicle movement state with other devices connected to a vehicle network. The other devices may enable positioning means deactivated.

In the case where the vehicle is in the traffic congestion section, a navigation device may suspend GPS operation or may increase a positioning period thereof. Furthermore, traveled distance information may be received through the odometer of the vehicle, and the location of the vehicle marked on the navigation device may be updated on the basis of the traveled distance information. If the traffic congestion is mitigated, the GPS operation is enabled so that a current location may be determined and marked on the navigation device.

<Altitude Information Acquisition Through Cooperative Positioning>

According to an embodiment of the present disclosure, altitude information may be determined through cooperative positioning.

A smartphone that is a first electronic device may have current location information. The smartphone may share the current location information with a watch-type device that is a second electronic device. The watch-type device may provide the current location information to a weather center or a weather service provider, and may receive barometric pressure information of a reference location of which an altitude is to be calculated, such as a sea level pressure of the current location. A band-type device that is a third electronic device may measure a barometric pressure of the current location using a barometric pressure sensor. The watch-type device may provide received sea level pressure information to the band-type device, and the band-type device may determine the altitude of the current location on the basis of the received sea level pressure information. Equation 1 is used to calculate an altitude using a barometer.

$$\rho = \rho_b \cdot \exp\left[\frac{-g_0 \cdot M \cdot (h - h_b)}{R^* \cdot T_b}\right] \quad \text{[Equation 1]}$$

where $\rho$=Mass density (kg/m$^3$)
T=Standard temperature (K)
h=Height above sea level (geopotential meters)
R*=Universal gas constant for air: 8.31432 N·m/(mol·K)
$g_0$=Gravitational acceleration (9.80665 m/s$^2$)
M=Molar mass of Earth's air (0.0289644 kg/mol)

<Selection of an Alternative Positioning Means from Among Peripheral Electronic Devices in a GPS Shadow Area>

According to an embodiment of the present disclosure, a satellite navigation system alone, which is a device for positioning, is installed as a device for monitoring a life pattern of a user. The user unintentionally enters a shadow area in which a visible path between a satellite and a device is not secured, such as an indoor place or an area where buildings are concentrated. At this moment, a positioning control module included in a life pattern monitoring electronic device synchronizes the positioning profile with that of the peripheral electronic device 200, and selects the peripheral electronic device 200 having a positioning device in addition to a satellite navigation system according to the positioning profile. Here, the positioning control module selects a device attached to a shoe capable of performing a PDR function, and requests and receives location information from the shoe, and then uses the location information. Thereafter, it is determined whether the user is outside the shadow area on the basis of map information of the electronic device and PDR information received from the shoe. If it is determined that the user is outside the shadow area, the electronic device operates the satellite navigation system, and consistently receives the PDR information from the shoe until a positioning result is received from the satellite navigation system, so as to use the PDR information to determine the location of the user.

<Using a Smartwatch or Smart Glasses as an Alternative Positioning Means>

According to an embodiment of the present disclosure, a user that uses a smartphone, a smartwatch, and smart glasses receives a location information request from a social network service (SNS) friend, consents to location sharing through the smart glasses, and starts positioning through the smartphone. However, the user may place the smartphone in a bag, a pocket, a handbag, or the like since the user wears the smartwatch or the smart glasses. Therefore, a signal from a satellite may be so weak that the smartphone may be unable to receive a satellite signal. In such a situation, the smartphone may recognize that it is connected to the smartwatch and the smart glasses through the positioning profile from a positioning manager, and may request location information from all the connected peripheral electronic devices 200. A module for recognizing a VLC signal installed in the smart glasses may receive an LED signal from a billboard of an adjacent building, and may obtain an ID transmitted from an LED. A positioning device of the smart glasses may detect a location of a region corresponding to the ID by searching a DB stored in an electronic device or a network, and may transfer location information to the smartphone. The smartwatch may recognize an inaudible frequency signal through a microphone of the smartwatch, and may transfer location information based on local advertisement information, address information, or the like to the smartphone. The smartphone that has received the location information from the two electronic devices may select or combine location information to be transmitted to the friend so as to use the selected or combined information as final location information.

<Using Time Information of a Peripheral Electronic Device in a Modem-Less Electronic Device>

According to an embodiment of the present disclosure, when a tablet PC not equipped with a modem performs positioning using the GPS, the table PC is unable to obtain time information from a modem. The time information, which is important for the GPS operated time synchronously, is one of the important parameters for quickly obtaining satellite information and calculating a location. In addition, there may be a reference location that is a parameter for assisting in satellite signal search window size and location determination in order to obtain a GPS signal together with the time information. In general, a location that is a reference for determining a time zone may be used as a reference location of a positioning system using the GPS. However, since the tablet PC not equipped with a modem is unable to obtain the above-mentioned information, the tablet PC may obtain the time information from a network time protocol (NTP) server. In this case, since the tablet PC may access a network through Wi-Fi, power consumption due to operation of a Wi-Fi device may be unavoidable. If there exists the peripheral electronic device 200 equipped with a modem, the above-mentioned information may be obtained therefrom. A positioning manager of the tablet PC may check the positioning profile stored in a positioning database, and may receive network information (MCC, MNC, or the like), time zone information, and time information from a corresponding electronic device. The table PC may receive, from an internal DB or a connected electronic device, information available as initial GPS location coordinates using the time zone information, and may synchronize a GPS positioning device of the tablet PC using the time information obtained from a modem. The GPS positioning device may search for a satellite signal using time synchronization information and an initial reference location received from the peripheral electronic device 200. The location of the table PC may be more quickly obtained through the GPS, and may be transferred to an application so as to be shown to a user through a display device.

A positioning method of a main electronic device or a peripheral electronic device according to various embodiments of the present disclosure may be implemented as a program executable in the main electronic device or the peripheral electronic device. This program may be stored in various types of recording media.

FIGS. 1-14 are provided as an example only. At least some of the steps discussed with respect to these figures can be performed concurrently, performed in a different order, and/or altogether omitted. It will be understood that the provision of the examples described herein, as well as clauses phrased as "such as," "e.g.", "including", "in some aspects," "in some implementations," and the like should not be interpreted as limiting the claimed subject matter to the specific examples.

The above-described aspects of the present disclosure can be implemented in hardware, firmware or via the execution of software or computer code that can be stored in a recording medium such as a CD-ROM, a Digital Versatile Disc (DVD), a magnetic tape, a RAM, a floppy disk, a hard disk, or a magneto-optical disk or computer code downloaded over a network originally stored on a remote recording medium or a non-transitory machine-readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

While the present disclosure has been particularly shown and described with reference to the examples provided therein, it will be understood by those skilled in the art that various changes in form and details may be made therein without departing from the spirit and scope of the present disclosure as defined by the appended claims.

What is claimed is:

1. A mobile communication device comprising:
a memory configured to store a first positioning profile corresponding to the mobile communication device, and a second positioning profile corresponding to a counterpart device, the counterpart device and the mobile communication device being part of a communications network; and
one or more processors configured to:
transmit a request for the second positioning profile to the counterpart device,
receive the second positioning profile from the counterpart device,
in response to determining that synchronization of the first positioning profile and the second positioning profile is required when a change in the first positioning profile or the second positioning profile affects cooperative positioning by the mobile communication device and the counterpart device, synchronize the first positioning profile and the second positioning profile based on data synchronization information included in the first positioning profile, wherein the data synchronization information includes information on a synchronization period or a synchronization time point,
assign a first positioning role to the mobile communication device and a second positioning role to the counterpart device based on the first positioning profile and the second positioning profile,
obtain at least one of a location information and a supplemental location information based on the first positioning role and the second positioning role, and
detect a location of the mobile communication device based on the at least one of the location information and supplemental location information,
wherein the first positioning profile further comprises:
positioning technology information indicating types of positioning technology available in the mobile communication device, and
an indication of a priority associated with a first positioning module of the mobile communication device, the priority being based on at least one of accuracy of the first positioning module, power consumption of the first positioning module, and time required for acquiring positioning information by the first positioning module.

2. The mobile communication device of claim 1, wherein the first positioning profile further comprises at least one of:

(i) location information measured by the first positioning module,
(ii) supplemental location information associated with the first positioning module,
(iii) an indication of a type of the location information,
(iv) an indication of a type of the supplemental location information, or
(v) an indication of a state of the mobile communication device.

3. The mobile communication device of claim 1, wherein the at least one processor is further configured to:
receive a positioning profile update from the counterpart device; and
update the second positioning profile based on the positioning profile update.

4. The mobile communication device of claim 3, wherein, the at least one processor is further configured to disseminate the positioning profile update across the communications network by transmitting the updated second positioning profile to at least one other counterpart device that is part of the communications network.

5. The mobile communication device of claim 1, wherein the at least one processor is further configured to delete the second positioning profile in response to the counterpart device leaving the communications network.

6. The mobile communication device of claim 1, wherein the first positioning role and the second positioning role are assigned based on (i) a power consumption associated with the first positioning module, and (ii) a power consumption associated with a second positioning module that is part of the counterpart device.

7. The mobile communication device of claim 1, wherein the first positioning role and the second positioning role are assigned based on (i) an accuracy associated with the first positioning module, and (ii) an accuracy associated a second positioning module that is part of the counterpart device.

8. The mobile communication device of claim 1, wherein the first positioning role and the second positioning role are assigned based on (i) the time required for acquiring position information by the first positioning module, and (ii) time required for acquiring position information by a second positioning module that is part of the counterpart device.

9. A method comprising:
obtaining a first positioning profile associated with a first mobile communication device;
transmitting a request for a second positioning profile associated with a second mobile communication device to the second mobile communication device;
obtaining the second positioning profile associated with the second mobile communication device from the second mobile communication device, wherein the first mobile communication device and the second mobile communication device are part of a communications network,
in response to determining that synchronization of the first positioning profile and the second positioning profile is required when a change in the first positioning profile or the second positioning profile affects cooperative positioning by the first mobile communication device and the second mobile communication device, synchronizing the first positioning profile and the second positioning profile based on data synchronization information included in the first positioning profile, wherein the data synchronization information includes information on a synchronization period or a synchronization time point;
assigning, by the first mobile communication device, a first positioning role to the first mobile communication device and a second positioning role to the second mobile communication device based on the first positioning profile and the second positioning profile;
obtaining at least one of a location information and a supplemental location information based on the first positioning role and the second positioning role; and
detecting a location of the first mobile communication device based on the at least one of the location information and the supplemental location information,
wherein the first positioning profile further comprises:
positioning technology information indicating types of positioning technology available in the first mobile communication device, and
an indication of a priority associated with a first positioning module of the first mobile communication device, the priority being based on at least one of accuracy of the first positioning module, power consumption of the first positioning module, and time required for acquiring positioning information by the first positioning module.

10. The method of claim 9, wherein the first positioning profile further comprises at least one of:
(i) location information measured by the first positioning module,
(ii) supplemental location information associated with the first positioning module,
(iii) an indication of a type of the location information,
(iv) an indication of a type of the supplemental location information, or
(v) an indication of a state of the first mobile communication device.

11. The method of claim 9, herein obtaining the second positioning profile comprises:
detecting whether the cooperative positioning is possible based on the first positioning profile and the second positioning profile; and
storing the second positioning profile in a memory of the first mobile communication device when the cooperative positioning is possible.

12. The method of claim 11, further comprising:
updating the first positioning profile; and
disseminating the updated first positioning profile across the communications network by transmitting the updated first positioning profile to at least one other device that is part of the communications network.

13. The method of claim 12, further comprising:
receiving a positioning profile update from the second mobile communication device;
updating the second positioning profile based on the positioning profile update; and
disseminating the updated second positioning profile across the communications network by transmitting the updated second positioning profile to at least one other device that is part of the communications network.

14. The method of claim 9, wherein the first mobile communication device is part of a first segment of the communications network and the second mobile communication device is part of a second segment of the communications network.

15. The method of claim 9, wherein the first positioning role and the second positioning role are assigned based on (i) a power consumption associated with the first positioning module, and (ii) a power consumption associated with a second positioning module that is part of the second mobile communication device.

16. The method of claim 9, wherein the first positioning role and the second positioning role are assigned based on (i) an accuracy associated with the first positioning module, and (ii) an accuracy associated a second positioning module that is part of the second mobile communication device.

17. The method of claim 9, wherein the first positioning role and the second positioning role are assigned based on (i) the time required for acquiring position information by the first positioning module, and (ii) time required for acquiring position information by a second positioning module that is part of the second mobile communication device.

18. The method of claim 9, wherein obtaining the location information comprises:
   transmitting a request to the second mobile communication device to identify a location of the second mobile communication device; and
   receiving, from the second mobile communication device, an indication of the location of the second mobile communication device, the location of the second mobile communication device being used as a proxy for the location of the first mobile communication device.

19. The method of claim 18, further comprising transmitting supplemental location information to the second mobile communication device together with the request to identify the location of the second mobile communication device, wherein the location of the second mobile communication device is identified based on the supplemental location information.

20. The method of claim 9, wherein obtaining the supplemental location information comprises:
   transmitting a request for supplemental location information to the second mobile communication device; and
   receiving the supplemental location information from the second mobile communication device.

* * * * *